United States Patent [19]
Kao et al.

[11] Patent Number: 5,977,251
[45] Date of Patent: Nov. 2, 1999

[54] NON-ADIABATIC OLEFIN SOLUTION POLYMERIZATION

[75] Inventors: Che I. Kao; R. Bruce Combs; Gary A. Camp, all of Lake Jackson; David A. Eversdyk, Angleton; Pradeep Jain; Greg A. Winter, both of Lake Jackson; Jeff H. Stultz, Freeport, all of Tex.

[73] Assignee: The Dow Chemical Company, Midland, Mich.

[21] Appl. No.: 08/831,172

[22] Filed: Apr. 1, 1997

Related U.S. Application Data

[60] Provisional application No. 60/014,705, Apr. 1, 1996.
[51] Int. Cl.$^6$ ..................................................... C08F 2/06
[52] U.S. Cl. ............................... 525/53; 526/65; 526/68; 526/69; 526/70; 526/905
[58] Field of Search .......................... 525/52, 53; 526/68, 526/69, 70, 64, 65

[56] References Cited

U.S. PATENT DOCUMENTS

| | | | |
|---|---|---|---|
| 3,242,150 | 3/1966 | Scoggin | 260/88.2 |
| 4,471,095 | 9/1984 | Wassen et al. | 526/65 |
| 5,286,884 | 2/1994 | Cowley et al. | 549/529 |

FOREIGN PATENT DOCUMENTS

| | | | |
|---|---|---|---|
| 0 479 186 | 4/1992 | European Pat. Off. | C08F 10/02 |
| 0 519 266 A1 | 12/1992 | European Pat. Off. | B01J 19/24 |
| 0 602 509 A2 | 6/1994 | European Pat. Off. | C08F 4/62 |
| 1 509 008 | 7/1975 | United Kingdom | G05D 23/20 |
| 95/10548 | 4/1995 | WIPO . | |

OTHER PUBLICATIONS

Abstract No. 94–193111/24 (EP 0 602 509 A2), 1994.
Abstract No. 92–425517/52 (EP 0 519 266 A1), 1992.
Dissertation Abstract AAD89–15540, 1989.
Dissertation Abstract AAD84–10765, 1984.
Dissertation Abstract AAD83–04964, 1982.
Dissertation Abstract AAD82–26984, 1982.
D. A. Heierle, "Static mixer–heat exchangers", *Chemical Plant & Processing*, 1989.
C. E. Meyer, "Laminar Flow Static Mixing–Design and Scaleup Criteria", *1991 AlChe Annual Meeting, Los Angeles, Nov. 17–22, 1991 Session No. 119*.
"Modernization of the TR. I De Solucion", Dow Chemical Iberica, S.A., Feb. 1995.
M. B. Welch et al., "Polyethylene Produced in Phillips Slurry Loop Reactors with Metallocene Catalysts", *Worldwide Metallocene Conference MetCon '95 May 17–19, 1995*.

*Primary Examiner*—David W. Wu

[57] ABSTRACT

A solution polymerization system for polymerizing a olefin monomer by reacting the monomer with catalyst and solvent has been invented. The system in one aspect including a flow loop with a product polymer outlet, the flow loop forming a recycling reactor, a catalyst inlet on the flow loop through which catalyst and solvent flow into the flow loop, a monomer inlet on the flow loop through which monomer and solvent flow into the flow loop and, with the catalyst, form a reactant materials stream, a first heat exchanger on the flow loop for receiving the reactant materials stream and any formed polymer and for removing heat of reaction or polymerization from the flow loop, and pump apparatus for pumping the reactant materials stream and formed polymer in the flow loop and from the first heat exchanger to the product polymer outlet. In one aspect, the system includes at least one additional heat exchanger on the flow loop for receiving the reactant materials stream and formed polymer and for removing heat of reaction or polymerization from the flow loop, the pump apparatus pumping formed polymer and remaining reactant materials to the product polymer outlet, and a portion of the formed polymer and remaining reactant materials flowing out from the product polymer outlet and the remainder recycling through the flow loop. In one aspect systems and methods according to the present invention are used to make polyethylene.

62 Claims, 8 Drawing Sheets

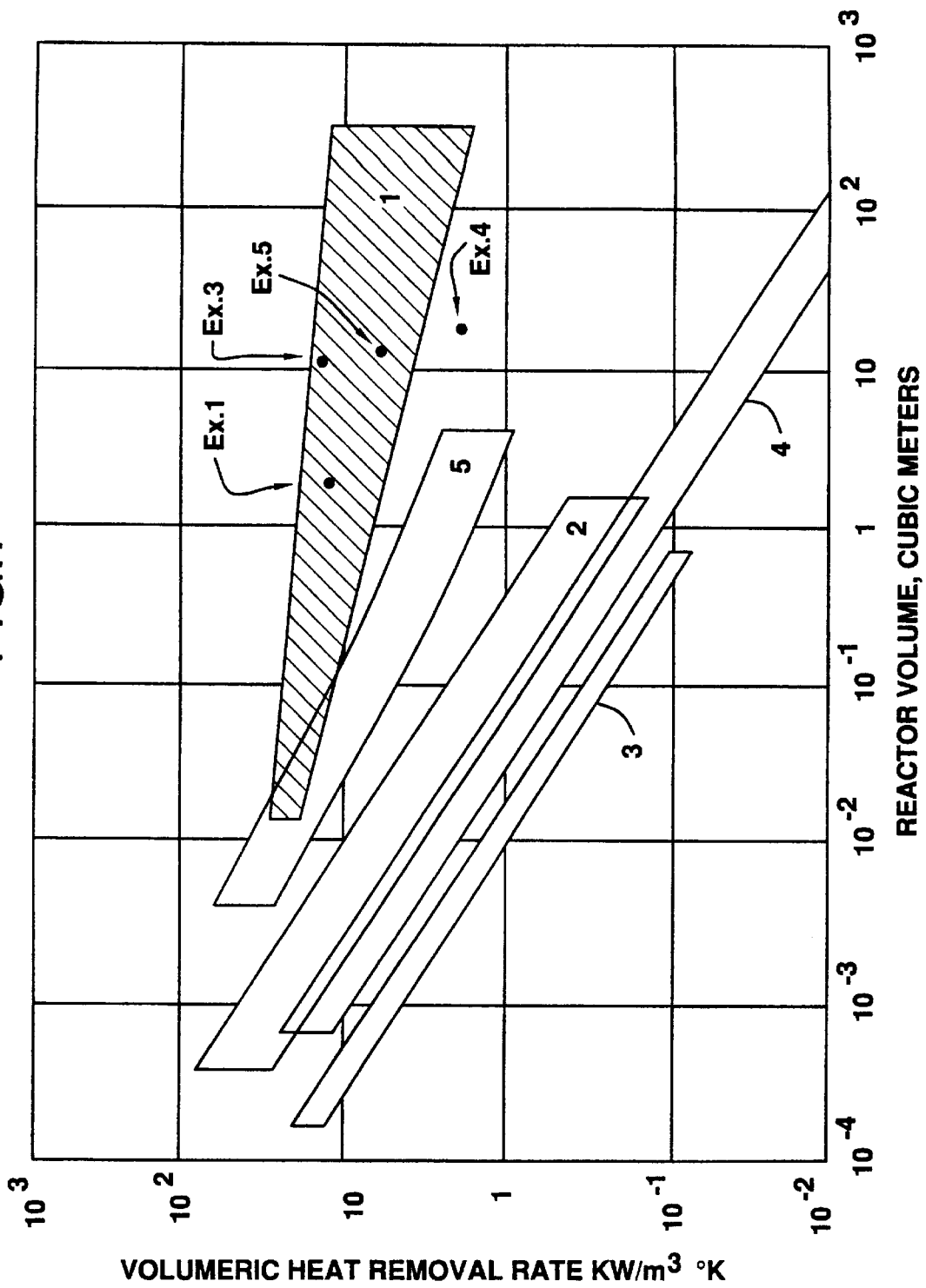

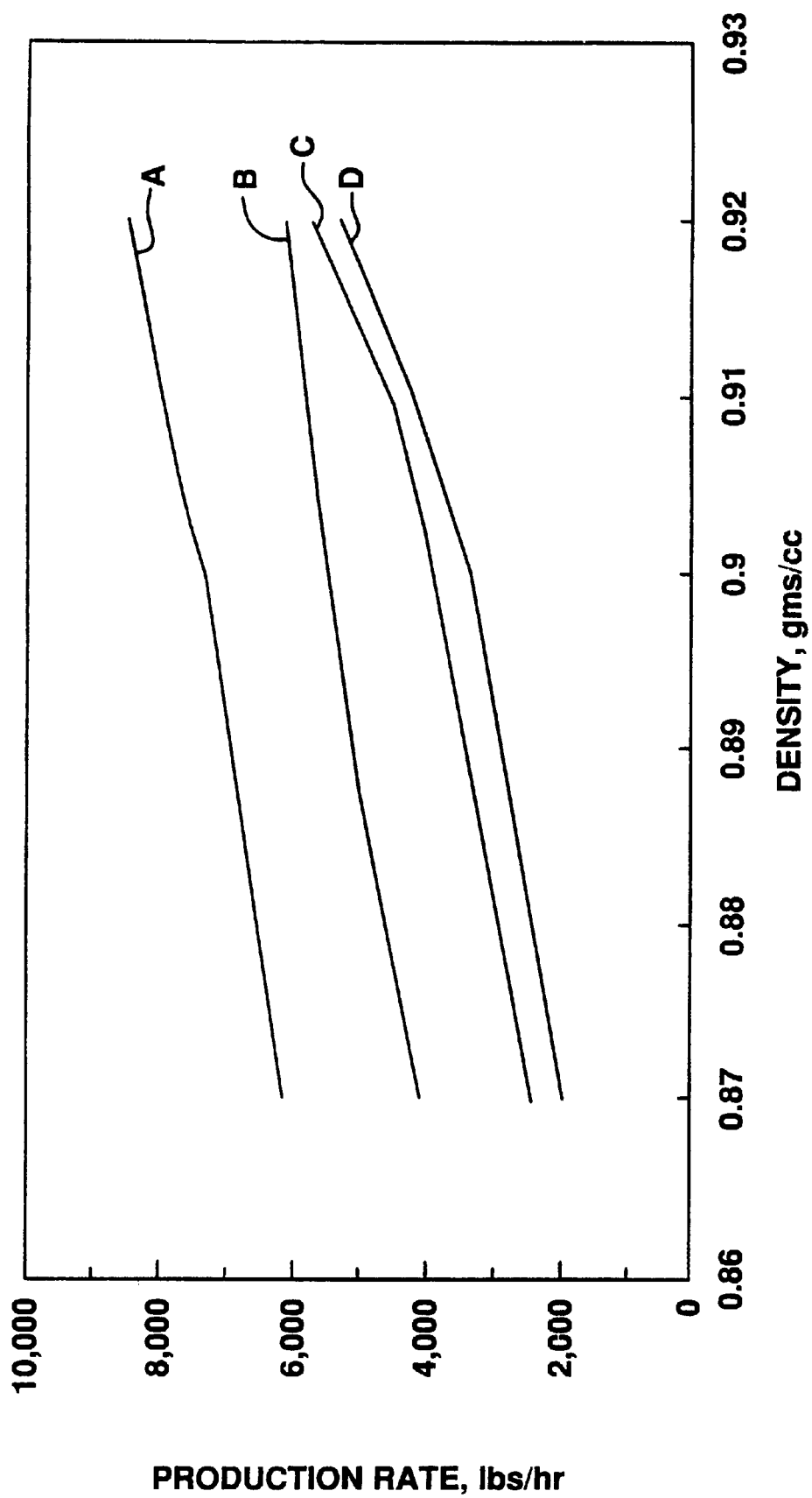

NON-ADIABATIC OLEFIN SOLUTION POLYMERIZATION

CROSS REFERENCE TO RELATED APPLICATIONS

This application claims benefit of Provisional Application No. 60/014,705 filed Apr. 1, 1996.

This application is related to application U.S. Ser. No. 08/544,497, filed Oct. 18, 1995, now U.S. Pat. No. 5,677,383; application U.S. Ser. No. 08/208,068, filed Mar. 8, 1994, now abandoned; application U.S. Ser. No. 08/592,756, filed Jan. 26, 1996, now abandoned; and application U.S. Ser. No. 08/327,156, filed Oct. 21, 1994, now abandoned the disclosures of all of which are incorporated herein, in their entirety, by reference.

BACKGROUND OF THE INVENTION

1. Field of the Invention

This invention is directed to an exothermic, controlled flow solution polymerization system and process. In particular, this invention pertains to a non-adiabatic, substantially well-mixed solution polymerization system and process for making ethylene, propylene, and styrene polymers including, but not limited to, polypropylene, styrene block copolymers, ethylene-propylene-diene monomer (EPDM) elastomers, ethylene-propylene (EP) elastomers, ethylene-styrene copolymers, ethylene/alpha-olefin interpolymers, and polyethylene.

2. Description of Related Art

Olefin manufacturers have long sought the ability to offer a wide range of product types all produced from a single process platform. With the development and advancement of metallocene catalyst complexes and the continued advancement of traditional Ziegler coordination catalyst systems, the potential has emerged to manufacture diverse olefin polymer types using a single polymerization system. With the recognized polymer product advantages derived from solution polymerization systems (relative to gas phase and slurry or particle-form processes), well-mixed, single- phase solution polymerization has been long perceived as the candidate process to allow full exploitation of various olefin catalyst advancements. However, known solution polymerization systems (i.e., adiabatic stirred tank reactor processes) have important shortcomings that must be resolved before the desired catalyst/polymer product exploitation can be realized. That is, significant process advancements are required beyond adiabatic, stirred reactor solution polymerization. For example, as a primary requirement, the desired solution polymerization system should accommodate or efficiently utilize the wide range of exothermic heats of reaction (heat of polymerization) occurring with respect to various olefin polymer types; for, example, ethylene polymerization being a relatively high heat generator and styrene polymerization being a relatively low heat generator.

Also, to meet accelerating volume potentials for olefin polymers manufactured using various catalyst advancements, particularly advancements pertaining to metallocene catalyst complexes, the desired solution polymerization system should accommodate or utilize the wide range of heats of reaction while maintaining high polymer production rates. Moreover, high productivity should be accomplished without the so-desired solution polymerization system being cost prohibitive to construct or operate, nor excessively large in physical size.

In particular, the desired solution polymerization system should overcome the typical limitations of adiabatic polymerizations wherein polymer concentration and conversion can not be adjusted freely and/or independently. That is, if the heat of reaction or polymerization can be removed from the polymerization system by means external to the polymerization reaction, then polymerization conditions, such as reactor temperature and polymer concentration, could be selectively controlled to selectively optimize polymer production rates, polymer structure, and catalyst efficiencies.

Himont's Spheripol process is well-known in the art of olefin polymerization. Loop polymerization systems are well-known for manufacturing polystyrene.

Meyer discloses in a paper presented at the AIChe Annual Meeting, Los Angeles, Nov. 17–22, 1991, the heat transfer capacities per unit volume for various reactor types. In FIG. 9 of the paper, Meyer discloses that pipe adapted with static mixing devices offers only incrementally improved heat removal relative to empty pipe or a stirred tank reactor. This same figure was also published as FIG. 11 in Chemical Plant & Processing, November 1989, the disclosure of which is incorporated herein by reference. The figure discloses that a static mixer/heat exchanger apparatus comprised of tortuous tubes or conduit pipes is a substantially superior heat exchange apparatus at process volumes greater than 1 cubic meter.

While various polymerization systems and/or reactor types are known for making various products, no known polymerization system or process meets the above stated object. That is, conventional, known loop reactor technology (such as, for example, standard engineering design packages commercially available from Koch which can also include known static mixer/heat exchanger reactors) do not meet the above stated object. For example, while known loop reactor technology can be readily employed for olefin polymerizations characterized by relatively low process side volumetric heat removal requirements, experiments show such technology is ill-suited for olefin polymerizations requiring relatively high heat removal rates.

For olefin polymerizations requiring high heat removal rates, known loop reactor systems are generally restricted to large process volume/size requirements, high recycle ratios and/or low production rates. Also, at least when used for high heat removal/high productivity solution polymerizations, known loop reactor systems are characterized by poor feed/catalyst mixing which results in the occurrence of cold, monomer-rich regions in the reactor system. The occurrence of these regions invariably results in the preparation of polymer product with undesirable polymer fraction, such as, for example, polymer fractions having a higher molecular weight and/or higher density relative to the bulk polymer. Also, these cold, monomer-rich reactor regions can give rise to liquid and/or solid separation (i.e., maldistribution) which in turn results in reactor instability, fouling, and plugging as well as gel formation and product compositional heterogeneity.

SUMMARY OF THE PRESENT INVENTION

We discovered a non-adiabatic solution polymerization system and process for making a full range of various olefin polymers comprising at least one olefin monomer such as ethylene, propylene, or styrene polymers and including, but not necessarily limited to, polypropylene, styrene block copolymers, ethylene-propylene-diene monomer (EPDM) elastomers, ethylene-propylene (EP) elastomers, ethylene-styrene copolymers, ethylene/alpha-olefin interpolymers, and polyethylene. The novel solution polymerization system and process is particularly suitable for making olefin polymers comprising ethylene as the at least one olefin monomer.

One aspect of the present invention is a solution polymerization system for polymerizing an olefin monomer in at least one reactor stream of at least one reactor with catalyst and solvent, the system comprising:

(A) at least one flow loop which forms the at least one reactor, the at least one reactor having a reactor volume, the at least one flow loop having:

(1) at least one product outlet, (2) at least one catalyst inlet through which catalyst flows into the at least one flow loop, (3) at least one monomer inlet through which monomer flows into the at least one flow loop and, with catalyst and solvent, forms a reaction stream, (4) at least one heat exchange apparatus which receives the reaction stream and polymer formed therein, and which removes heat of reaction or polymerization from the at least one flow loop, and (5) at least one pump apparatus for pumping the reaction stream and polymer around the at least one flow loop, (B) a portion of the reaction stream and polymer exiting the at least one flow loop through the at least one product outlet, and (C) the at least one heat exchange apparatus removing heat of reaction or polymerization from the polymer and reaction stream at a rate of at least 400 Btu/hour·cubic foote·°F. (7.4 kW/m$^3$·°K).

Another aspect of the invention is a solution polymerization system for polymerizing an olefin monomer in a reactor stream of two or more reactors with catalyst and solvent, the system comprising:

(A) a first flow loop which forms a first reactor, the first reactor having a first reactor volume, the first flow loop having:

(i) at least one first product outlet, (ii) at least one first catalyst inlet through which catalyst flows into the first flow loop, (iii) at least one first monomer inlet through which monomer flows into the first flow loop and, with catalyst and solvent, forms a first reaction stream, (iv) at least one first heat exchange apparatus which receives the first reaction stream and first polymer formed therein, and which removes heat of reaction or polymerization from the first flow loop, and (v) at least one first pump apparatus for pumping the first reaction stream and first polymer in the first flow loop from the at least one first heat exchange apparatus to the at least one first product outlet, and (B) a second flow loop which forms a second reactor, the second reactor having a second reactor volume, the second flow loop having:

(i) at least one second product outlet, (ii) at least one second catalyst inlet through which catalyst flows into the second flow loop, (iii) at least one second monomer inlet through which monomer flows into the second flow loop and, with catalyst and solvent, forms a second reaction stream, (iv) at least one second heat exchange apparatus which receives the second reaction stream and second polymer formed therein, and which removes heat of reaction or polymerization from the second flow loop, and (v) at least one second pump apparatus for pumping the second reaction stream and second polymer in the second flow loop from the at least one second heat exchange apparatus to the second product outlet, and (C) the at least one first heat exchange apparatus and the at least one second heat exchange apparatus removing total heat of reaction or polymerization from the reactor streams at a rate of at least about 400 Btu/hour·cubic foot·°F. (7.4 kW/m$^3$·°K), (D) the second flow loop having at least one product inlet into which flows the first polymer and a portion of the first reactor stream from the at least one first product outlet of the first flow loop, and (E) a portion of first polymer, second polymer, first reaction stream and second reaction stream exiting the second flow loop through the at least one second product outlet.

One surprising result obtainable with the novel nonadiabatic system and process disclosed herein is, in certain embodiments, olefin polymer manufacturers can make substantially linear ethylene polymer products with higher long chain branching levels at higher production rates and substantially equivalent catalyst efficiencies or, alternatively, olefin polymer manufacturers can make the same substantially linear ethylene polymer products at higher production rates and substantially higher catalyst efficiencies relative to the capabilities existing for known adiabatic solution polymerization processes. Important aspects of the present invention pertain to enhanced heat removal rates and enhanced mixing of monomer, catalyst and solvent reactor (s) stream relative to known loop reactor systems such that high productivity and desired product requirements are met while substantially avoiding typical polymerization problems that include reactor instability, excessive reactor fouling, objectionable gel formation and/or undesirable product composition heterogeneity.

Another important aspect of the present novel solution polymerization system and process is the ability to control polymer concentration in reactor streams is substantially independent or more independent of monomer conversion. Certain specific aspects relate to providing a catalyst/solvent injector that introduces a confined, restricted amount of the catalyst well-mixed in solvent into the flow loop and to providing a monomer injector that introduces a finely dispersed stream or streams of monomer into the flow loop such as, for example, an injector designed with multiple flow exit ports and positioned in the flow loop to provide a finely dispersed stream traversing axially across the flow loop. Although not limited thereto, a certain specific aspect of the present invention, relates to sequencing and/or the orientation of the at least one catalyst/solvent injector in relation to the at least one monomer injector and/or, in certain embodiments, relates to sequencing and/or the orientation of the at least one catalyst/solvent injector in relation to at least one mixing device or mixer provided to the flow loop.

In certain embodiments, the solution polymerization system includes a catalyst/solvent injector (as shown in U.S. Pat. No. 4,808,007) which has an elongated hollow tubular member, a constricted part intermediate to its ends with a mixing zone comprised of two cylindrical orifices whose axes are parallel to the axis of the tubular member for flow of a first fluid (e.g. recycle reactor contents) and a fluid entry port for discharging a second fluid (e.g. catalyst system which may include catalyst, cocatalyst, support, and/or carrier) between the two cylindrical orifices. The solution polymerization system also has, in certain specific embodiments, a static or mechanical mixer disposed downstream of the catalyst/solvent injector. Monomer and solvent (and other ingredients) may be injected through the monomer injector. Another static or mechanical mixer, in certain embodiments, is disposed between the monomer injector and the first heat exchange apparatus. In still other embodiment, monomer and/or catalyst is injected in the mechanical mixer.

Any suitable heat exchange apparatus may be used, in any configuration, including, for example, a cooling coil positioned in the flow loop, a shell-and-tube heat exchanger positioned in the flow loop wherein the flow stream passes through the tubes or the entire flow loop being designed as a heat exchange apparatus by providing cooling via a jacket or double piping. In one aspect, a form of shell-and-tube heat exchanger is used with a housing having an inlet and an outlet for the reaction mixture and an inlet and outlet for heat transfer media (e.g. water, water/glycol, steam, SYLTHERM™ material or media supplied by The Dow Chemical Company under the designation DOWTHERM®). The reaction mixture flows through a plurality of heat transfer tubes within the housing while the heat transfer media flows over the tubes' exterior surfaces transferring the heat of reaction or polymerization from the reaction mixture. Alternatively, the reaction stream flows through the housing and the heat transfer media flows through the tubes. In one aspect, the at least one heat exchange apparatus is a commercially available item (such as, for example, a static mixer/heat exchanger supplied by Koch) having a tortuous path therethrough defined by the tubes' tubular walls and/or having solid static interior elements forming an interior web through which the reaction mixture flows. However, another surprising aspect of the invention, wherein objects of the invention are met (i.e., high productivity and high heat removal while avoiding reactor instability, excessive reactor fouling, objectionable gel formation and/or undesirable product compositional heterogeneity), is even when the at least one heat exchange apparatus consists of a plurality of nontortuous tubes or conduits and the at least one reactor stream or mixture flows through the tubes while the heat transfer media flows over the tubes' exterior surfaces.

The term "tortuous" is used herein in the same sense as known in the art to refer to a heat exchange apparatus that has a plurality of mixing elements which comprise intersecting webs of interconnected tubes or conduit (with or without internal mixing elements) and wherein successive mix elements are positioned at some substantial offset angle (e.g. tubes with a 90° bend) to each other thereby creating a tortuous flow path for the product and the heat transfer media.

The term "nontortuous" as used herein refers to a heat exchange apparatus that has a plurality of tubes or conduit wherein the tubes or conduit may have internal mixing elements and/or external surfaces comprised of mixing elements, however the tubes or conduit are not positioned at any substantial offset angle (e.g. straight tubes) relative to each other.

In certain systems, as described above, the flow loop reactor includes at least one heat exchange apparatus with nontortuous tubular conduits as well as a second heat exchange apparatus and the at least one product outlet. A pump or pumps may be in the flow loop or within one of the heat exchangers, such as, for example, positioned in a top portion thereof. In one aspect catalyst, solvent, and monomer are injected together through one injector.

In certain embodiments of the solution polymerization system, as described above, a monomer injector is used which finely disperses the monomer into the flowing catalyst/solvent stream to insure that the reaction mixture is a substantially single phase solution or a mixture with solid catalyst suspended therein. In one aspect, such a monomer feed injector has a body positioned in the flowing reactor stream and the body has a plurality of fluid flow ports through which exit monomer feed (e.g. monomer, comonomer, terminator, and solvent) flowing upstream, sideways, or downstream into the reactor stream. However, downstream flow is preferred to avoid substantial impingement that can lead to reactor instabilities.

In one aspect, the body of the monomer feed injector has a circular cross-section as viewed from above; in one aspect, a donut-shaped cross-section; in another aspect a hollow body with multiple arms (e.g. 4, 10 or 12 arms) which each arm having multiple injector exit ports; and in still another aspect, exit ports of the injector are disposed at different axial positions. These injectors can be positioned in the reaction stream in any orientation and multiple injectors may be positioned at different axial positions in the reactor. In one aspect injectors are positioned offset from each other (e.g. looking into the reactor from above) so that materials are injected into substantially the whole cross-section of the reaction stream. A mechanical stirrer may be used in the reactor at each inlet or nearby for stirring ingredients as they enter into the reaction stream. In another aspect, any ingredient or combination of ingredients may be mixed and/or reacted in a stirring tank external to the flow loop or, alternatively, internal to the flow loop.

Two or more such reactor systems as described above, each with at least one heat exchange apparatus arranged in series or in parallel or, for more than two reactors, in any series/parallel combination, may be used according to the present invention. Multiple reactor systems may consist of multiple loop reactors or at least one loop reactor as a part of a multiple reactor system wherein the at least one other reactor is any known reactor type, such as, for example, an extruder, stirred tank or a plug-flow tube. In such a multiple reactor system, different catalyst systems may be used in each reactor system; for example, but not limited to, in a first reactor system, a constrained-geometry catalyst (as described in U.S. Pat. No. 5,064,802, the disclosure of which is incorporated herein by reference) may be used and in a second reactor system, a heterogeneous Ziegler catalyst system (as described in U.S. Pat. No. 4,314,912, the disclosure of which is incorporated herein by reference) may be used. Different catalysts may be used to produce polymer products with enhanced performance characteristics, e.g. improved toughness, dart impact, sealability, processability and heat resistivity as described in copending applications U.S. Ser. No. 08/544,497, filed Oct. 18, 1995 now U.S. Pat. No. 5,677,383, and U.S. Ser. No. 08/327,156, filed Oct. 21, 1994, now abandoned the disclosures of both which are incorporated herein in their entirety by reference.

The solution polymerization system, as disclosed herein, may employ: an olefin monomer (e.g. ethylene) feed in solution with a suitable paraffinic, isoparaffinic, naphthinic, or aromatic hydrocarbon solvent such as, for example, toluene, cyclohexane, hexane, heptane, octane, nonane, isooctane, ethylbenzene, isopentane, and the like. One especially suitable hydrocarbon solvent is Isopar-E, a $C_8$–$C_{10}$ hydrocarbon which is commercially available from Exxon Corporation.

In one aspect, solution polymerization systems, as described herein, are used to make polyethylene. The product polymer flowing from the product outlet includes desirable polyethylene polymer and some other materials such as solvent and volatile components which are removed in downstream processing elements such as devolatilizers, horizontally agitated dryers, or devolatilizing extruders. In certain embodiments, sufficient pressures (i.e. in the range of about 100 to about 600 psig, preferably in the range from about 450 to about 600 psig, most preferably about 475 psig and especially greater than about 520 psig) are maintained in the reactor system to maintain the reaction mixture as a single phase or substantially single phase liquid solution and/or to conduct the process at lower recycle ratios (e.g. recycle ratios less than about 80). Reactor pressure may be controlled anywhere in the system. For example, a pressure control valve on the loop product outlet line may be used to maintain the pump suction pressure.

"Residence time" as used herein is the process side reactor volume in gallons divided by total reactor volumetric throughput rate in gallons per minute and "circulation time" as used herein is the process side reactor volume in gallons divided by the pump volumetric throughput rate in gallons per minute. Recycle ratio is the residence time in minutes divided by the circulation time in minutes. "Volumetric heat removal rate" as used herein is the process heat transfer coefficient, U, in Btu/hour·square foot·°F., multiplied by the heat exchange area, A, in square feet, of the heat exchange apparatus divided by the total reactor system volume, in cubic feet. One of ordinary skill will recognize that there should be consistency respecting whether process side or outside parameters are used as to U and surface area calculations and determinations. The calculations contained herein are based on the outside surface areas and outside diameters of heat exchange tubes, coils, etc. whether or not the reactor mixture flows through such tubes, coils, etc. or not.

Certain solution polymerization systems according to the present invention have a volumetric heat removal rate generally equal to or greater than about 85 Btu/hour·cubic foot·°F., preferably equal to or greater than about 150 Btu/hour·cubic foot·°F., more preferably equal to or greater than about 350 Btu/hour·cubic foot·°F., and in certain embodiments, equal to or greater than about 400 Btu/hour·cubic foot·°F., especially equal to or greater than about 600 Btu/hourecubic foot·°F., more especially equal to or greater than about 1,200 Btu/hour·cubic foot·°F. and most especially equal to or greater than about 2,000 Btu/hour·cubic foot·°F.

Also, certain solution polymerization systems according to the present invention have a reactor size greater than 1 cubic meter, preferably greater than or equal to 3 cubic meters, more preferably greater than or equal to 10 cubic meters, and most preferably greater than or equal to 12 cubic meters and as high as 50 cubic meters.

One broad aspect of the present invention is a non-adiabatic solution polymerization system and process for making an olefin polymer having at least one olefin monomer. By the term "non-adiabatic" it is meant that the novel solution polymerization system and process is characterized as having a volumetric heat removal rate of greater than or equal to about 1 Btu/hour·cubic foot·°F. as related to the heat of reaction or polymerization for the olefin polymer.

In one aspect, polymer concentration in the reactor is such that a desirable product polymer is produced with the process conducted at a recycle ratio of less than about 80, preferably less than about 25, more preferably less than about 15, especially less than about 10 and most especially less than about 5. In certain systems and processes of the invention, the recycle ratio is greater than or equal to zero, i.e., the system or process is essentially a plug-flow polymerization system or process. With the lower recycle ratios possible with the present invention, reactor stability is increased and the flow loop temperature gradient and monomer concentration gradients are narrowed such that the molecular weight distribution and the compositional homogeneity of the polymer product are not adversely affected.

The novel solution polymerization systems and processes of the present invention are further characterized as having flow loop temperature gradients or spreads less than about 100° C., especially less than about 50° C. and most especially less than about 20° C. and, in certain embodiments, surprisingly, even less than about 5° C. Similar to the characteristic low recycle ratios, the low flow loop temperature gradients of the present invention help insure the molecular weight distribution and the compositional homogeneity of the polymer product are not adversely affected.

In certain systems and processes according to the present invention, the reactor streams flow in a substantially laminar manner as opposed to in a substantially turbulent manner. In one aspect, such reactor stream flows can be within the transitional regime between substantially turbulent flow and substantially laminar flow. However, preferably, the reactor flows are characterized by a Reynold's number of at most about 2,200; in certain embodiments, the reactor stream flow is characterized by a Reynold's number of at most about 2,000; and in other embodiments, the reactor stream flow is characterized by a Reynold's number ranging between about 0.01 to about 2,000. In certain particular processes and systems for making ethylene polymers according to the present invention, the Reynold's number for the reactor stream ranges between about 0.05 to about 500. In such processes and systems according to the present invention, the reactor stream flow velocity in the flow loop generally ranges between 0.01 foot/second to about 25 feet/second and preferably less than about 10 feet/second and in certain aspects, ranges between about 0.01 foot/second to about 9 feetjsecond and in specific processes and systems ranges between about 0.1 foot/second to about 7 feet/second and especially between about 2 feet/second to about 7 feet/second.

A reactor stream according to the present invention with high polymer concentrations is desirable, since less downstream processing (e.g. devolatilization) is required, resulting in less energy consumption and lower heat history. Although, as in any polymerization system, higher polymer concentrations are limited by polymer molecular weight, feed and reactor ethylene solubility, loop reactor pressure limits, and solution viscosities, the present invention promotes formation of polymer products at higher reaction stream polymer concentrations by effectively removing the heat of reaction or polymerization via heat transfer media, rather than by previous practices such as adding additional solvent to the system.

The reaction stream of the present invention is also characterized by low viscosities, although polymer concentrations are higher and reactor stream viscosities are considered to be "steeply increasingly" as the term has been used in the art (see, for example, *Chemical Plant & Processing*, November 1989). That is, the reaction stream undergoes a step-change from the monomer inlet to the product outlet in that the reaction stream increases in viscosity from about 1 centipoise at the monomer inlet to no more than 200,000 centipoise, preferably to no more than 50,000 centipoise, more preferably to no more than 10,000 centipoise and most preferably to no more than 5,000 centipoise at the product outlet. During this step-change, although there may be some portion of the system or process that is essentially adiabatic, polymerization and total heat removal are continuous and simultaneous.

In the production of olefin polymers (and especially ethylene polymers) in accordance with the present invention, monomer-rich cold spot regions within the solution polymerization system are minimized or eliminated;

heat is removed efficiently to allow the decoupling of reactor polymer concentration and reactor temperature; process parameters (e.g. temperature, pressure, residence time, flow rates, and pump speed) are controlled and effective mixing of reactants is achieved so that a single solution phase is maintained or substantially maintained and the presence of a distinct vapor phase within the reaction stream is avoided; and a product polymer production rate per unit volume per hour of at least about 0.7 pounds per hour per gallon of reactor volume is achieved, with at least about five pounds per hour per gallon of reactor volume preferred, at least about twelve pounds per hour per gallon of reactor volume more preferred, and at least fifteen pounds per hour per gallon of reactor volume most preferred.

Multiple feed injection, i.e. injecting catalyst, monomer, comonomer and/or terminator at different points (e.g. catalyst and monomer each at a plurality of points, catalyst above monomer or vice versa, alternating multiple catalyst and monomer injection points, or injecting monomer separate from comonomer injection), is preferred in certain embodiments since such tends to decrease the temperature differential and monomer concentration differential in the reactor stream.

In one system for producing an ethylene polymer, a single loop reactor system (loop reactor as described herein) of 49 gallons total process side volume produces up to 220 pounds per hour of product polymer with a polymer concentration in the loop reactor system of about 26% by weight (based on the total weight of the reactor stream), a residence time in the loop reactor system of about 17 minutes and an average pumping rate of about 20 gallons of reactor stream contents per minute in the loop reactor system. The loop reactor system achieved a 4.5 pounds of polymer production per hour per gallon of reactor volume. Recycle ratio for the loop reactor system was about 7.3. In one aspect, a post-reactor heater may be used to heat polymer solution conveyed from the loop reactor. Solution thus heated has solvent removed therefrom, e.g. the solution is then sent to a flash vessel in which solvent is removed. The polymer product is then collected.

The present invention discloses, in certain embodiments, systems for the continuous or batch solution polymerization of a monomer in a reaction stream of a reactor with at least one catalyst and solvent, the solvent introduced into the reactor, the system having a flow loop recycling reactor having at least one product outlet, at least one catalyst inlet on the flow loop through which catalyst flows into the flow loop, at least one monomer inlet on the flow loop through which monomer flows into the flow loop and, forming a reaction stream with catalyst and the solvent, heat exchange apparatus on the flow loop which receives the reaction stream and polymer formed therein, and removes heat of reaction or polymerization from the flow loop, pump apparatus for pumping the reaction stream and polymer around the flow loop, and also in certain aspects from the heat exchange apparatus to the product outlet; such a system wherein the heat exchange apparatus is a first heat exchanger, with a housing through which a heat transfer media flows and a plurality of static mixer heat exchange tubes through which the reactor stream and polymer flow, the reactor stream and polymer flowing out from the first heat exchanger into the flow loop for further movement therethrough; such a system with at least one additional heat exchanger on the flow loop for receiving the reactor stream and polymer and for removing heat of reaction or polymerization from the reactor stream with the pump apparatus pumping the reactor stream and polymer to the product outlet, a portion of the polymer and reactor stream flowing out from the product outlet and a portion of the reactor stream and polymer recycling through the flow loop; such a system with the at least one monomer inlet positioned below the at least one catalyst inlet; such a system wherein the heat exchange apparatus is a first heat exchanger and at least one additional heat exchanger and one catalyst inlet and one monomer inlet above the first heat exchanger, the pump apparatus for pumping the reactor stream and polymer from the first heat exchanger to the at least one additional heat exchanger; such a system with at least one static mixer disposed in the flow loop between the at least one catalyst inlet and the at least one monomer inlet for mixing materials flowing into the flow loop; such a system with at least one static mixer disposed in the flow loop between the at least one monomer inlet and the heat exchange apparatus for mixing the reactor stream; such a system with at least one monomer injector in the flow loop in fluid communication with the at least one monomer inlet so that monomer and solvent flow into the flow loop through the at least one monomer injector; such a system wherein the at least one monomer injector is a hollow body with a hollow inlet and a plurality of spaced-apart hollow arms in fluid communication with the hollow inlet, each of the plurality of hollow arms having a plurality of spaced-apart fluid exit ports through which monomer flows into the flow loop; such a system in which the at least one monomer inlet is below the at least one catalyst inlet; such a system wherein solvent flows with the least one catalyst into the flow loop through the at least one catalyst inlet; such a system wherein solvent flows with monomer into the flow loop through the at least one monomer inlet; such a system with at least one catalyst injector in the flow loop in fluid communication with the at least one catalyst inlet so that the at least one catalyst and solvent flow into the flow loop through the at least one catalyst injector; such a system wherein the at least one catalyst inlet has a body with a solvent inlet, a mixing zone into which solvent flows in fluid communication with the solvent inlet, a catalyst port through which the at least one catalyst is introducible into the mixing zone, and an outlet through which flows the mixed at least one catalyst and solvent into the flow loop; such a system wherein the reactor stream and polymer are maintained substantially as a liquid phase solution; such a system wherein the flow loop has a flow loop volume and polymer is produced at a rate of at least about 0.7 pounds per hour per gallon of flow loop volume, at least about 5 pounds per hour per gallon of flow loop volume, at least about 12 pounds per hour per gallon of flow loop volume, or at a rate of at least about 15 pounds per hour per gallon of flow loop volume; such a system wherein polymer is produced with a recycle ratio of less than about 80, less than about 25, less than about 15, less than about 10, less than about 5 or greater than or equal to zero; such a system wherein the polymer is an ethylene polymer; such a system wherein the at least one catalyst is a metallocene catalyst complex and/or a heterogeneous Ziegler coordination catalyst system; such a system wherein a terminating agent is introduced through the at least one monomer inlet; such a system wherein residence time is equal to or less than about 120 minutes, or preferably equal to or less than about 90 minutes and in certain preferred embodiments, equal to or less than about 50 minutes, preferably equal to or less than about 12 minutes, and especially equal to or less than about 6.5 minutes and as low as about 1 minute; such a system with two or more flow loop reactors, as described herein, in series or in parallel or in a combination thereof. Processes according to this invention use the systems disclosed herein.

It is, therefore, an object of at least certain preferred embodiments of the present invention to provide new, useful, unique, efficient, nonobvious systems and processes for exothermic solution polymerization and, in one aspect, such systems and processes for making ethylene polymers such as, for example, but not limited to, ethylene/styrene copolymers, ethylene/propylene interpolymers, heterogeneously branched ethylene/alpha olefin copolymers (e.g. heterogeneously branched linear low density polyethylene (LLDPE)), high density polyethylene (HDPE), homogeneously branched linear ethylene/alpha olefin copolymers and homogeneously branched substantially linear ethylene/alpha olefin polymers.

Certain embodiments of this invention are not limited to any particular individual feature disclosed herein, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned object and long-felt need and provides a solution to such in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. However, the detail in these descriptions is not intended to limit the invention.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 7 is a plot of volumetric heat removal rates (in kW/m3*K) as a function of system volume (in cubic meters) for solution polymerization systems according to the present invention and known polymerization systems FIG. 8 is a contour plot of production rate in pounds per hour as a function of product density (in grams per cubic centimeter) comparing the $I_{10}/I_2$ process range capability of a solution polymerization system of the present invention and a conventional adiabatic solution polymerization system.

DESCRIPTION OF PREFERRED EMBODIMENTS

Figure 1:
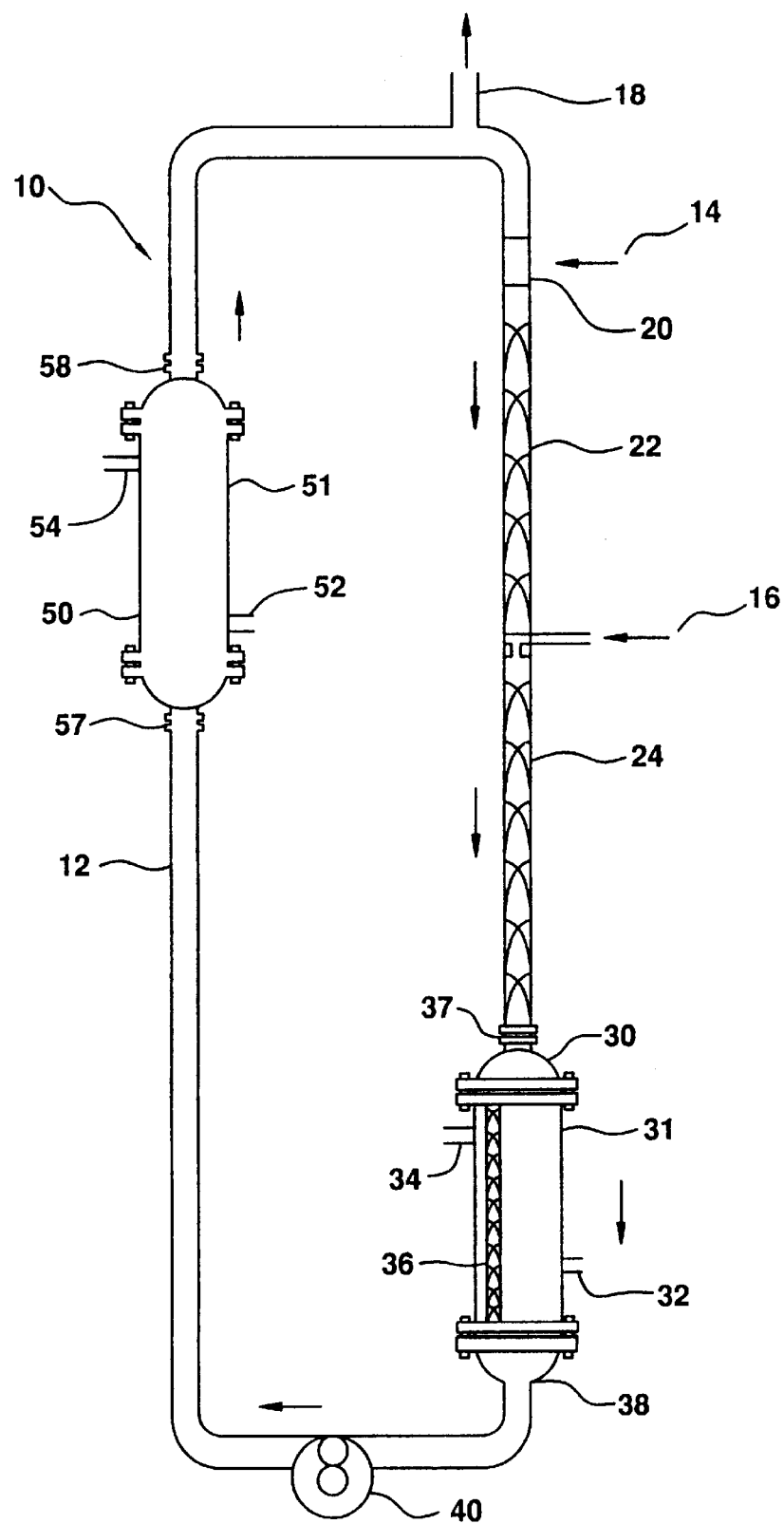
FIG. 1 is a schematic view of a solution polymerization system according to the present invention.

Referring now to FIG. 1, a solution polymerization system 10 according to the present invention has a flow loop 12 with a catalyst inlet 14, a monomer inlet 16 and a product polymer outlet 18. Catalyst and solvent enter the system through the catalyst inlet 14. In one preferred embodiment catalyst and solvent are mixed and continuously injected with a dual viscosity mixer 20, e.g. as shown in U.S. Pat. Nos. 4,616,937; 4,753,535 and 4,808,007. The catalyst and solvent mix to form a mixture with solid catalyst suspended therein or to form a solution of the catalyst and solvent. The mixture or solution then flows down the flow loop to a point of monomer introduction at a monomer inlet. In another aspect as shown in FIG. 1 with respect to flow loop 12 and monomer inlet 16, catalyst is continuously introduced below the monomer injection point. The resulting mixture or solution flows as a reactor stream through the system 10 with polymer forming therein producing heat of reaction or polymerization.

In certain aspects, further mixing of catalyst and solvent into the reactor stream is accomplished in a mixer 22, e.g. stirrer or agitator or a commercially available static mixer such as those of Komax Systems, Inc.; Husky Injection Molding Systems, Ltd.; KMX, KM, and HEV Kenics mixers of Chemineer, Inc.; SMV, SMVL, SMX, SMXL, SMXL-B, SMXL-R, SMR and SMF mixers of Koch-Sulzer, Inc.; and LPP, LLPD, and LSG mixers of Ross Engineering, Inc.

Figure 3A:
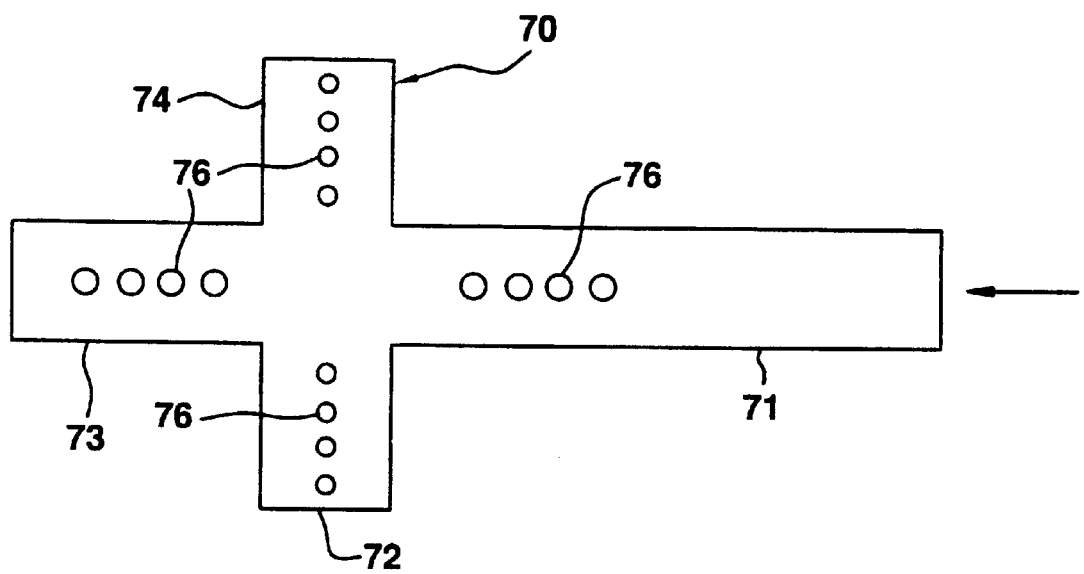
FIG. 3A is a bottom view of an injector according to the present invention.
Figure 3B:
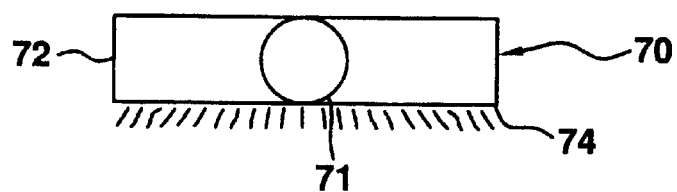
FIG. 3B is an end view of the injector of FIG. 3A.

A mixture of monomer, comonomer(s) and solvent and, if desired, a terminating agent (e.g. hydrogen) enters the flow loop 12 at the monomer inlet 16. For enhanced mixing of monomer, catalyst, solvent and other ingredients, the monomer and solvent are, in certain embodiments, continuously injected into the flowing reactor stream flowing from the static mixer 22. Monomer alone may be separately injected. Terminator(s) may be injected alone or with monomer or comonomer or with catalyst. Any suitable known injector may be used for these purposes. In one aspect of the present invention, an injector 70 as shown in FIGS. 3A and 3B is used. The injector 70 has a hollow body with four hollow arms 71, 72, 73, 74 each with a plurality of spaced-apart fluid exit ports 76. The injector 70 may be at any angle in the flow loop 12, e.g., but not limited to, with exit ports disposed so that monomer flows upstream, downstream, sideways or in any other desired direction. The fluid exit ports themselves may also be formed so that monomer exits from the injector in a desired direction. Preferably monomer is injected so that a large area of the total flow area receives monomer, preferably at least thirty percent of the total cross-sectional reactor flow area. Catalyst and/or monomer may be injected into the flow loop 12 at desired additional points.

The resulting liquid reactor stream with catalyst, solvent, monomer and other ingredients, if present, flows downstream in the flow loop 12 to a first heat exchanger 30. In certain embodiments, a mechanical mixer, a mechanical mixer and a static mixer or a static mixer 24 is used between the monomer inlet 16 and the first heat exchanger 30. Heat transfer media flows into a housing 31 of the first heat exchanger 30 in an inlet 32 and out through an outlet 34. Any suitable heat exchange tube may be used within the housing 31. In one embodiment, nontortuous tubular static mixers are used as heat exchange tubes 36 (one shown in FIG. 1) and a plurality, (e.g. two or more and depending on the scale of the system, preferably forty or more and in certain embodiments at commercial production scale between one thousand and six thousand or especially between four thousand and five thousand), are used. The reactor stream and formed polymer resulting from the reaction therein of the reactants flows (by gravity and by pumping action) into the heat exchanger housing 31 through the housing inlet 37 and then out through the housing outlet 38. The polymerization reaction proceeds throughout loop 12 with polymer forming as the reactant materials flow to the product outlet 18 at which some product polymer and portion of the reactor stream-are removed with the remainder of the reactor stream flowing past the product outlet 18 back through the loop.

A pump 40 pumps the reactant materials and polymer from the first heat exchanger and up the flow loop 12 to an optional second heat exchanger 50 (like the first heat exchanger 30 ) which has a housing 51, an inlet 57, an outlet 58, a heat transfer media inlet 52 and a heat transfer media outlet 54. One or more additional heat exchangers may be used in the flow loop 12. A pressure control valve for controlling pressure may be used on the flow loop outlet 18. The pump 40 itself may be used to further enhance mixing of the ingredients of the reaction stream flowing through it.

A mechanical stirrer or agitator for catalyst and/or monomer may be used in addition to or in place of any or all of the static mixers.

Figure 2:
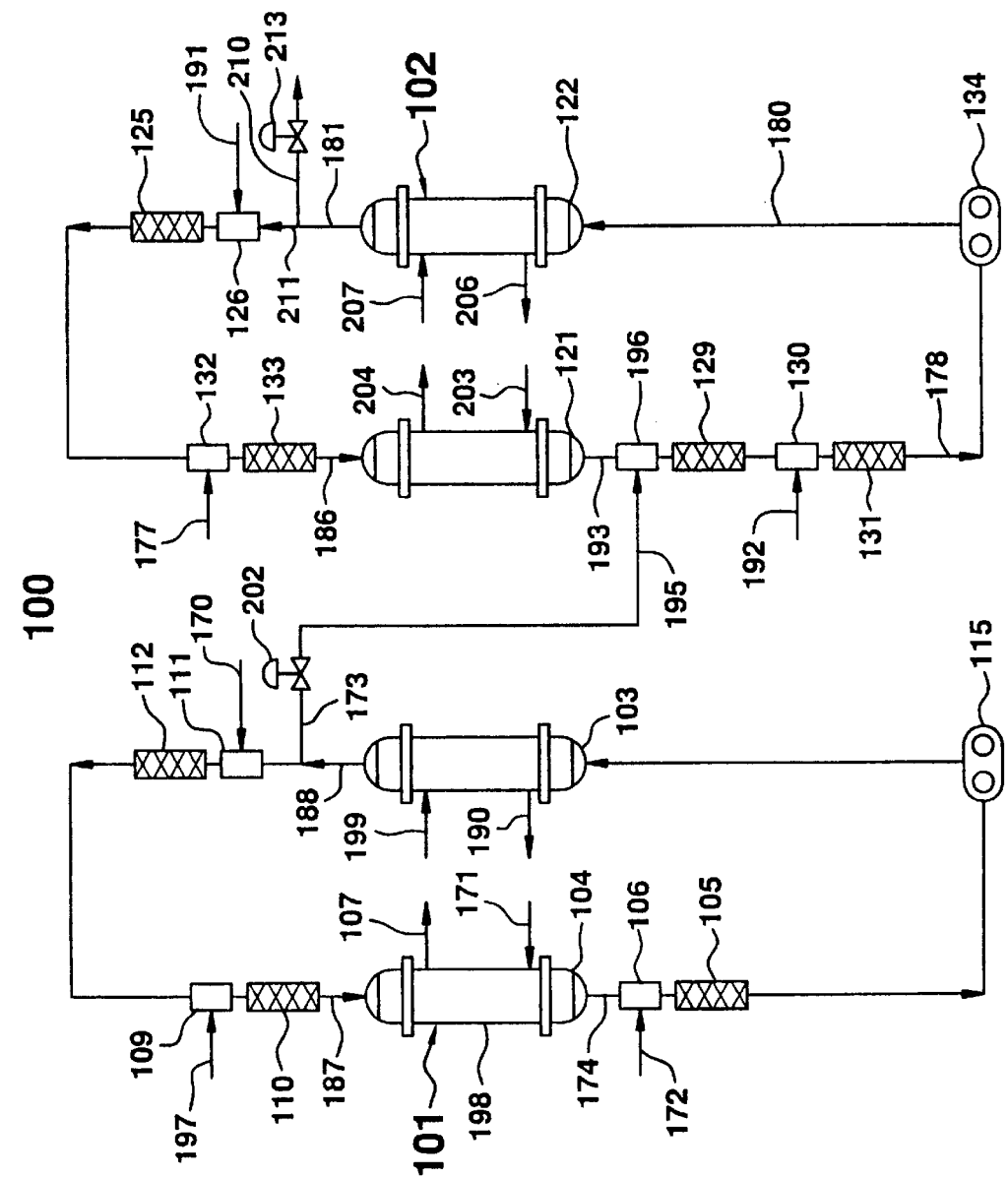
FIG. 2 is a schematic view of a solution polymerization system according to the present invention.

Referring now to FIG. 2, a solution polymerization system 100 according to the present invention has a flow loop 101 (which constitutes a flow loop reactor) with a catalyst inlet 197, two monomer inlets 170 and 172 and a product polymer outlet 173. Product polymer and a portion of reactant stream from the flow loop 101 product polymer outlet 173 enter a second flow loop 102 via a line 195. The second flow loop 102 (which constitutes a flow loop reactor) has a catalyst inlet 177, two monomer inlets 191 and 192, an inlet 196, and a product polymer outlet 210.

Catalyst and solvent continuously enter the first flow loop 101 through the catalyst inlet 197. In one preferred embodiment catalyst and solvent are mixed and continuously injected with a dual viscosity injector 109. The catalyst and solvent mix to form a mixture with solid catalyst suspended therein or the catalyst goes into solution in the solvent. A reactor stream flows down in the loop 101 to a static mixer 110 which mixes the reactor stream, solvent, and catalyst. The stream continues downstream in a line 187 into a shell-and-tube heat exchanger 104 with a shell 198 and internal heat exchange tubes (not shown). The heat of reaction or polymerization of the stream is partially removed by water cooling media entering the shell 198 in a line 171 and exiting in a line 107. The cooled stream exits the exchanger 104 via a line 174 and flows downstream to a feed injector 106 at a point of continuous monomer introduction at the monomer inlet 172. In certain aspects further mixing of catalyst and solvent into the reactor stream is accomplished in a mixer 105, e.g. a commercially available static mixer.

A pump 115 pumps the reactant materials and polymer around the flow loop 101. The flowing reactor stream from the pump 115 flows into a heat exchanger 103 where more of the heat of reaction or polymerization is removed by the water cooling media entering the shell in a line 199 and exiting in a line 190. The polymerization reaction proceeds throughout the flow loop 101 with polymer forming as the reactor stream flows to a product outlet 173. In a continuous system, some of the material in the reactor stream flows continuously past the product outlet 173 and back through the loop. A pressure control valve 202 for controlling pressure may be used on the flow loop outlet 173. A mixture of monomer, comonomer(s) and solvent and, if desired, a terminating agent continuously enter the flow loop 101 at the monomer inlets 170 and 172. For enhanced mixing of monomer, catalyst, solvent and other ingredients, the monomer and solvent are, in certain embodiments, continuously injected into the flowing reactor stream. In certain embodiments, a static mixer 112 is used between a monomer inlet 170 and a corresponding monomer injector 111 and the catalyst injector 109 and a static mixer 105 is used between the monomer inlet 172 and the pump 115.

In the second flow loop 102, reactant materials flow from an injector 126 to a static mixer 125 and then through a line 186 to a first heat exchanger 121. Heat transfer media is pumped through the first heat exchanger 121 in lines 203 (in) and 204 (out). Fo 6 rmed polymer and the reactor stream flow out from the heat exchanger 121 in the line 193 where they are joined by feed from the flow loop 101 at the inlet 196 (an injector maybe used at the inlet 196).

The stream then flows from the inlet 196, to a static mixer 129, and then past a-monomer injector 130 at which monomer and solvent are injected in a line 192 into the flow stream. The resulting reactor stream then flows to and through a static mixer 131 and in a line 178 to a pump 134. The pump 134 pumps the reactant materials stream in a line 180 to a second heat exchanger 122. A heat transfer system flows heat transfer media through the second heat exchanger 122 in through a line 207 and out through a line 206. Reactant materials and polymer flow in a line 181 past an outlet line 210. A valve 213 controls pressure in the system.

In the continuous system or process according to the invention, a portion of formed polymer and reactor stream exit the system in the line 210 and remaining portions continue on in a line 211 past the injector 126.

Figure 4:
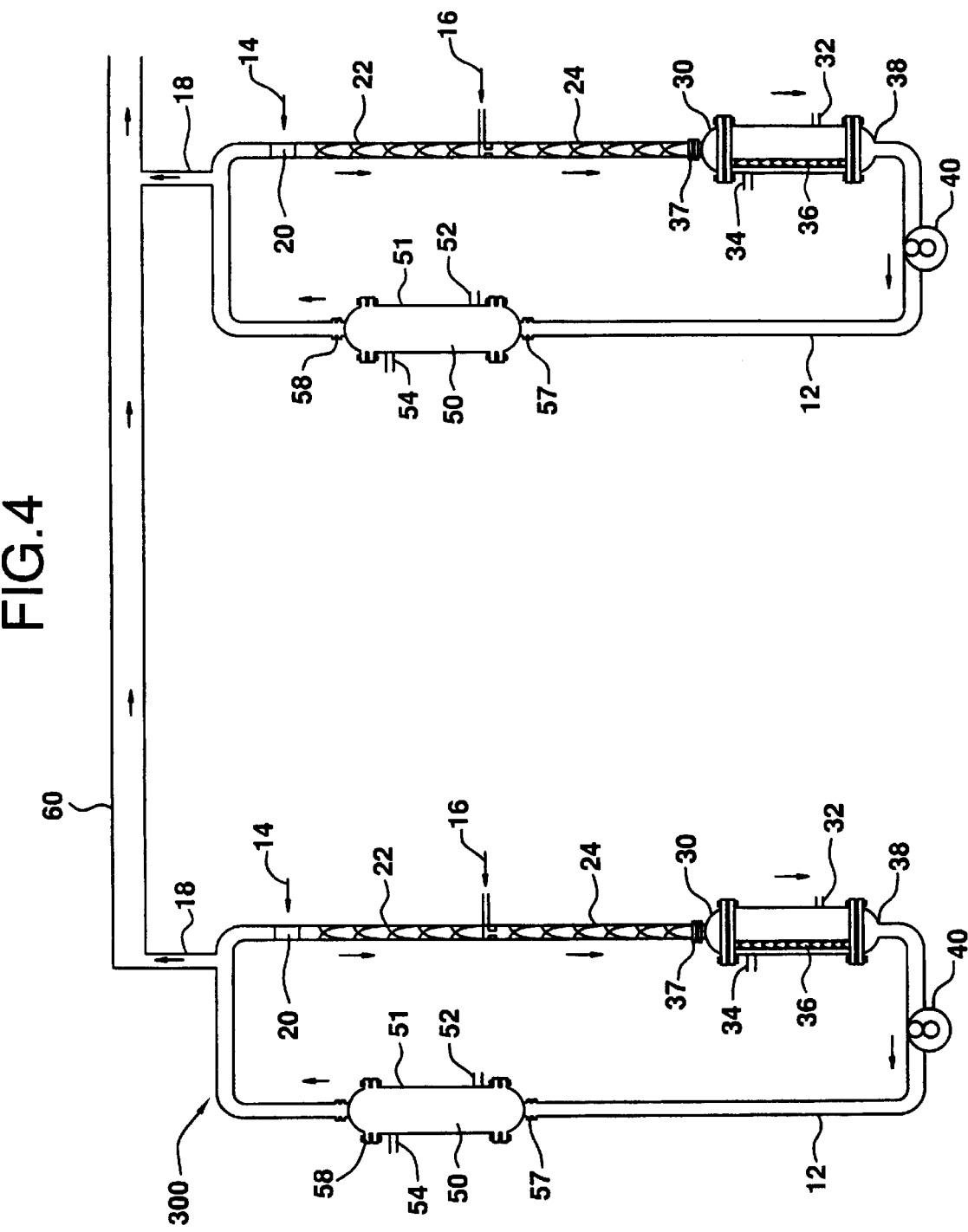
FIG. 4 is a schematic view of a solution polymerization system according to the present invention.

FIG. 4 shows solution polymerization system 300, which comprises at least two loop reactors, as previously described, in a parallel configuration (in contrast to FIG. 2 which shows solution polymerization system 100 which comprises at least two loop reactors configured in series). For solution polymerization system 300, separate reactor streams and separate portions of polymer product flow from the at least two product outlets 18 into a common outlet line 60.

Figure 5:
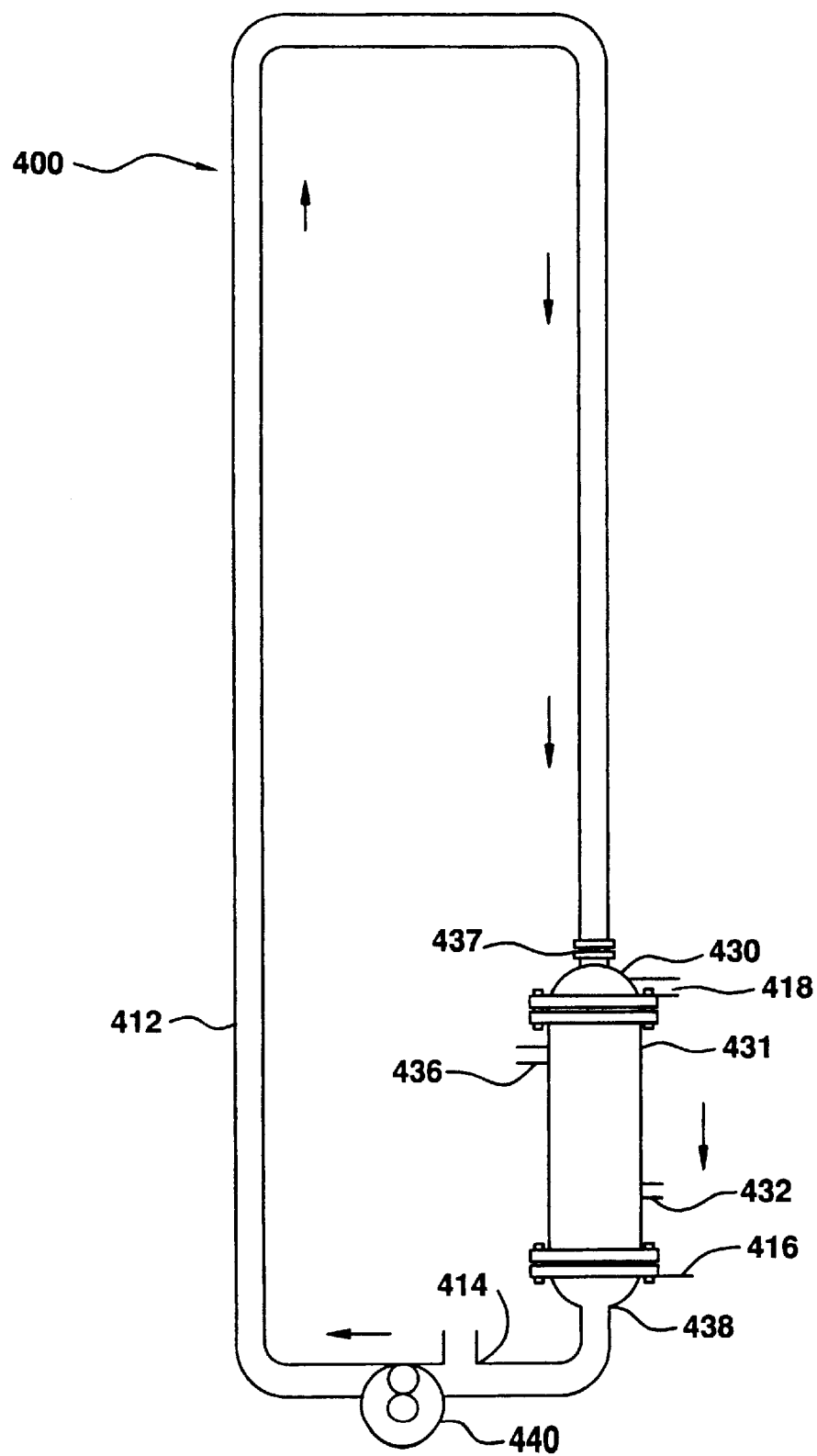
FIG. 5 is a schematic view of a solution polymerization system according to the present invention.

Referring now to FIG. 5, a solution polymerization system 400, according to the present invention, has a flow loop 412 with a catalyst inlet 414, a monomer inlet 416 and a product polymer outlet 418. A mixture of monomer, comonomer(s) and solvent and, if desired, a terminating agent (e.g. hydrogen) enters the flow loop 412 at the monomer inlet 416. Monomer alone may be separately injected. Any suitable known injector may be used for this purpose. The injector may be at any angle in the flow loop 412, for example, but not limited to, with exit ports disposed so that monomer flows upstream, downstream, sideways or in any other desired direction. The fluid exit ports themselves may also be formed so that monomer exits from the injector in a desired direction. Preferably monomer is injected so that a large area of the total flow area receives monomer, more preferably at least thirty percent of the total cross-sectional reactor flow area. Catalyst and/or monomer may be injected into the flow loop 412 at desired additional points.

Catalyst and solvent enter the system through the catalyst inlet 414. In one preferred embodiment, catalyst and solvent are mixed and continuously injected with a dual viscosity mixer, e.g. as shown in U.S. Pat. Nos. 4,616,937; 4,753,535 and 4,808,007. The catalyst and solvent mix to form a mixture with solid catalyst suspended therein or to form a solution of the catalyst and solvent. The resulting mixture or solution of catalyst, monomer, solvent, reactor stream and terminating agent, if needed, flows as a reactor stream through the system 400 with polymer forming therein producing heat of reaction or polymerization.

The resulting liquid reactor stream with catalyst, solvent, monomer and other ingredients, if present, flows in the flow loop 412 into the pump 440. From the pump the stream flows around the flow loop 412 to a product outlet 418. The polymerization reaction proceeds throughout flow loop 412 with polymer forming as the reactant materials flow to the product outlet 418 at which some product polymer and portion of the reactor stream are removed with the remainder of the reactor stream flowing past the product outlet 418 back through the loop. The remaining reactor stream that does not leave the outlet 418 flows in to the heat exchange apparatus 430. The reactor stream and formed polymer resulting from the reaction therein of the reactants flows into the housing 431 of the heat exchange apparatus through an inlet 437 and out through an outlet 438 and then (by gravity and/or by pumping action) from the monomer inlet 416 to the housing outlet 438. One or more additional heat exchange apparatus may be used in the flow loop 412. A pressure control valve for controlling pressure may be used on the flow loop outlet 418. The pump 440 itself may be used to further enhance mixing of the ingredients of the reaction stream flowing through it.

A mechanical stirrer or agitator for catalyst and/or monomer may be used for additional system mixing if required.

Figure 6:
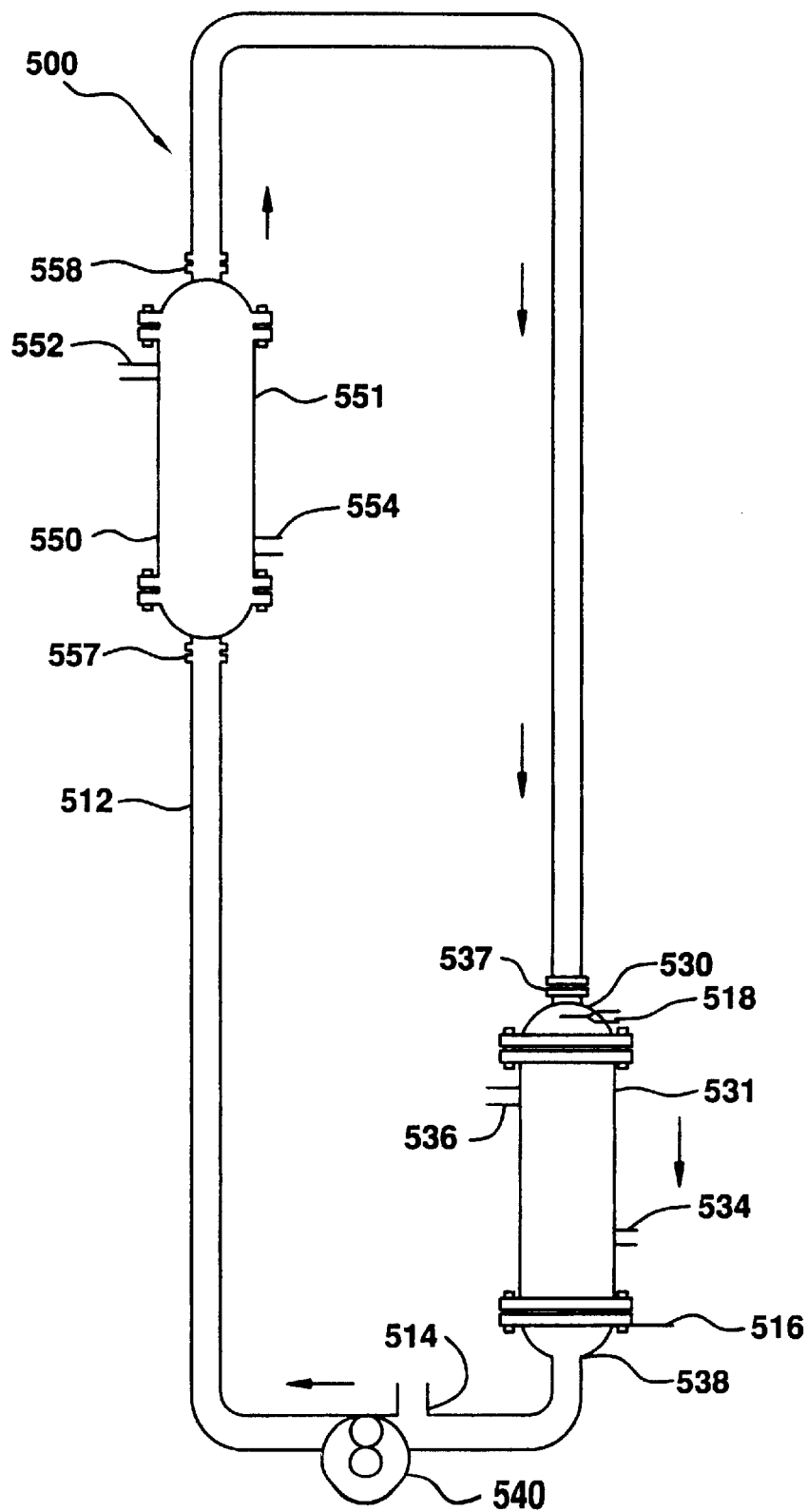
FIG. 6 is a schematic view of a solution polymerization system according to the present invention.

Referring now to FIG. 6, a solution polymerization system 500 according to the present invention has a flow loop 512 with a catalyst inlet 514, a monomer inlet 516 and a product polymer outlet 518. A mixture of monomer, comonomer(s) and solvent and, if desired, a terminating agent (e.g. hydrogen) enters the flow loop 512 at the monomer inlet 516. Monomer alone may be separately injected. Any suitable known injector may be used for this purpose. The injector may be at any angle in the flow loop 512, e.g., but not limited to, with exit ports disposed so that monomer flows upstream, downstream, sideways or in any other desired direction. The fluid exit ports themselves may also be formed so that monomer exits from the injector in a desired direction. Preferably, monomer is injected so that a large area of the total flow area receives monomer, preferably at least thirty percent of the total cross-sectional reactor flow area. Catalyst and/or monomer may be injected into the flow loop 512 at desired additional points.

Catalyst and solvent enter the system through the catalyst inlet 514. In one preferred embodiment, catalyst and solvent are mixed and continuously injected with a dual viscosity mixer, e.g. as shown in U.S. Pat. Nos. 4,616,937; 4,753,535 and 4,808,007. The catalyst and solvent mix to form a mixture with solid catalyst suspended therein or to form a solution of the catalyst and solvent. The resulting mixture or solution of catalyst, monomer, solvent, reactor stream and terminating agent, if needed, flows as a reactor stream through the system 500 with polymer forming therein producing heat of reaction or polymerization.

The resulting liquid reactor stream with catalyst, solvent, monomer and other ingredients, if present, flows in the flow loop 512 into the pump 540 which pumps the reactant materials and polymer from the first heat exchange apparatus 530 and up the flow loop 512 to a second heat exchanger 550 which has a housing 551, an inlet 557, an outlet 558, a heat transfer media inlet 552 and a heat transfer media outlet 554. One or more additional heat exchangers may be used in the flow loop 512. From the pump the stream flows around the system 12 to a product outlet 518. The polymerization reaction proceeds throughout loop 512 with polymer forming as the reactant materials flow to the product outlet 518 at which some product polymer and portion of the reactor stream are removed with the remainder of the reactor stream flowing past the product outlet 518 back through the loop. The remaining reactor stream that does not leave the outlet 518 flows into the heat exchange apparatus 530. The reactor stream and formed polymer resulting from the reaction therein of the reactants flows into the housing 531 through an inlet 537 and out through an outlet 538 and then (by gravity and/or by pumping action) from the monomer inlet 516 to the housing outlet 538. Heat transfer media enters the inlet 534 and heat transfer media exits the outlet 536. A pressure control valve for controlling pressure may be used on the flow loop outlet 518. The pump 540 itself may be used to further enhance mixing of the ingredients of the reaction stream flowing through it.

A mechanical stirrer or agitator for catalyst and/or monomer may be used for additional system mixing if required.

Suitable catalysts for use in the present invention may be any known olefin polymerization catalyst or catalyst system, including so-called homogeneous and heterogeneous catalysts and/or catalyst systems. In one aspect of the present invention, one catalyst system is employed in the loop reactor system although it may introduced at a plurality of introduction points throughout the reactor system. In another aspect of the invention, in a multiple loop reactor system, in series or in parallel configuration, one or more catalyst systems are employed in at least two different loop reactors, such as, for example, in a two loop reactor system, one aspect of the present invention employs at least one homogeneous catalyst system in the first loop reactor and at least one heterogeneous catalyst system in the second loop reactor or a first homogeneous catalyst system (or, alternatively, a first heterogeneous catalyst systems) in the first loop reactor and a second homogeneous catalyst system (or, alternatively, a second heterogeneous catalyst systems) in the second loop reactor.

Catalysts and catalyst systems for use in the invention are described, for example, in EP-A-0 277 003; EP-A-0 277 004; EP-A-0 420 436; PCT International Publications WO 91/04257; WO 92/00333; WO 93/08221; and WO 93/08199, U.S. Pat. Nos. 3,645,992; 4,076,698; 4,612,300; 4,937,299; 5,096,867; 5,055,438; and 5,064,802, the disclosures of all of which are incorporated herein by reference.

Suitable homogeneous catalyst components for use in the present invention may be derivatives of any transition metal including Lanthanides, but preferably of Group 3, 4, or Lanthanide metals which are in the +2, +3, or +4 formal oxidation state. Preferred compounds include metal complexes containing from 1 to 3 π-bonded anionic or neutral ligand groups, which may be cyclic or non-cyclic delocalized π-bonded anionic ligand groups. Exemplary of such π-bonded anionic ligand groups are conjugated or nonconjugated, cyclic or non-cyclic dienyl groups, allyl groups, and arene groups. By the term "π-bonded" is meant that the ligand group is bonded to the transition metal by means of a π bond.

Examples of suitable anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, and decahydro-anthracenyl groups, as well as $C_{1-10}$ hydrocarbyl-substituted or $C_{1-10}$ hydrocarbyl-substituted silyl substituted derivatives thereof. Preferred anionic delocalized π-bonded groups are cyclopentadienyl, pentamethylcyclopentadienyl, tetramethylcyclopentadienyl, tetramethylsilylcyclopentadienyl, indenyl, 2,3-dimethylindenyl, fluorenyl, 2-methylindenyl, 2-methyl-4-phenylindenyl, tetrahydro-fluorenyl, octahydrofluorenyl, and tetrahydroindenyl.

Examples of the complexes containing two L groups are compounds corresponding to the formula:

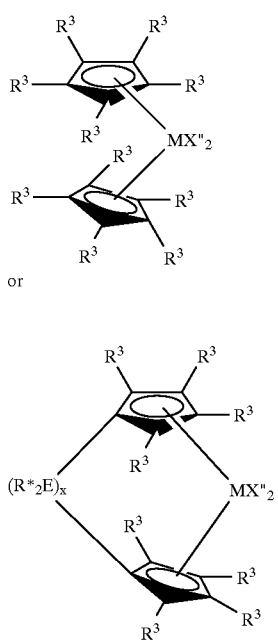

wherein:

M is titanium, zirconium or hafnium, preferably zirconium or hafnium, in the +2 or +4 formal oxidation state;

$R^3$ in each occurrence independently is selected from the group consisting of hydrogen, hydrocarbyl, silyl, germyl, and combinations thereof, said $R^3$ having up to 20 non-hydrogen atoms, or adjacent $R^3$ groups together form a divalent derivative thereby forming a fused ring system, and X" independently each occurrence is an anionic ligand group of up to 40 non-hydrogen atoms, or two X" groups together form a divalent anionic ligand group of up to 40 non-hydrogen atoms or together are a conjugated diene having from 4 to 30 non-hydrogen atoms forming a π-complex with M, whereupon M is in the +2 formal oxidation state, and for the formula $(ER^*_2)_xE$ is silicon, germanium, tin, or carbon, R* independently each occurrence is hydrogen or a group selected from silyl, hydrocarbyl, hydrocarbyloxy and combinations thereof, said R* having up to 30 carbon or silicon atoms, and x is 1 to 8 are as previously defined.

The foregoing metal complexes are especially suited for the preparation of polymers having stereoregular molecular structure. In such capacity it is preferred that the complex possesses $C_s$ symmetry or possesses a chiral, stereorigid structure. Examples of the first type are compounds possessing different delocalized π-bonded systems, such as one cyclopentadienyl group and one fluorenyl group. Similar systems based on Ti(IV) or Zr(IV) were disclosed for preparation of syndiotactic olefin polymers in Ewen, et al., J. Am. Chem. Soc. 110, 6255–6256 (1980). Examples of chiral structures include rac bis-indenyl complexes. Similar systems based on Ti(IV) or Zr(IV) were disclosed for preparation of isotactic olefin polymers in Wild et al., J. Organomet. Chem., 232, 233–47, (1982).

Exemplary bridged ligands containing two π-bonded groups are: (dimethylsilyl-bis(cyclopentadienyl)), (dimethylsilyl-bis(methylcyclopentadienyl)), (dimethylsilyl-bis(ethylcyclopentadienyl)), (dimethylsilyl-bis(t-butylcyclopentadienyl)), (dimethylsilyl-bis(tetramethylcyclopentadienyl)), (dimethylsilyl-bis(indenyl)), (dimethylsilyl-bis(tetrahydroindenyl)), (dimethylsilyl-bis(fluorenyl)), (dimethylsilyl-bis(tetrahydrofluorenyl)), (dimethylsilyl-bis(2-methyl-4-phenylindenyl)), (dimethylsilyl-bis(2-methylindenyl)), (dimethylsilyl-cyclopentadienyl-fluorenyl), (dimethylsilyl-cyclopentadienyl-octahydro fluorenyl), (dimethylsilyl-cyclopentadienyl-tetrahydrofluorenyl), (1,1,2,2-tetramethyl-1,2-disilyl-bis-cyclopentadienyl), (1,2-bis(cyclopentadienyl)ethane, and (isopropylidene-cyclopentadienyl-fluorenyl).

Preferred XI" groups are selected from hydride, hydrocarbyl, silyl, germyl, halohydrocarbyl, halosilyl, silylhydrocarbyl and aminohydrocarbyl groups, or two XI" groups together form a divalent derivative of a conjugated diene or else together they form a neutral, π-bonded, conjugated diene. Most preferred X" groups are $C_{1-20}$ hydrocarbyl groups.

A suitable class of complexes are transition metal complexes corresponding to the formula:

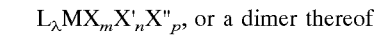

wherein:

L is an anionic, delocalized, π-bonded group that is bound to M, containing up to 50 non-hydrogen atoms, optionally two L groups may be joined together forming a bridged structure, and further optionally one L may be bound to X or X';

M is a metal of Group 4 of the Periodic Table of the Elements in the +2, +3 or +4 formal oxidation state;

X is an optional, divalent substituent of up to 50 non-hydrogen atoms that together with L forms a metallocycle with M;

X' is an optional neutral Lewis base having up to 20 non-hydrogen atoms;

X" each occurrence is a monovalent, anionic moiety having up to 40 non-hydrogen atoms, optionally, two X" groups may be covalently bound together forming a divalent dianionic moiety having both valences bound to M, or, optionally 2 X" groups may be covalently bound together to form a neutral, conjugated or nonconjugated diene that is π-bonded to M (whereupon M is in the +2 oxidation state), or further optionally one or more X" and one or more X' groups may be bonded together thereby forming a moiety that is both covalently bound to M and coordinated thereto by means of Lewis base functionality;

λ is 0, 1 or 2;
m is 0 or 1;
n is a number from 0 to 3;
p is an integer from 0 to 3; and
the sum, λ+m+p, is equal to the formal oxidation state of M, except when 2 X" groups together form a neutral conjugated or non-conjugated diene that is π-bonded to M, in which case the sum λ+m is equal to the formal oxidation state of M.

Preferred complexes include those containing either one or two L groups. The latter complexes include those containing a bridging group linking the two L groups. Preferred bridging groups are those corresponding to the formula $(ER^*_2)_x$ wherein E, R* and x are as defined above. Preferably, R* independently each occurrence is methyl, ethyl, propyl, benzyl, tert-butyl, phenyl, methoxy, ethoxy or phenoxy.

Preferred divalent X substituents include groups containing up to 30 non-hydrogen atoms comprising at least one atom that is boron or a member of Group 14 of the Periodic Table of the Elements directly attached to the delocalized π-bonded group, and a different atom, selected from the group consisting of nitrogen, phosphorus, oxygen or sulfur that is covalently bonded to M.

A preferred class of such Group 4 metal coordination complexes used according to the present invention corresponds to the formula:

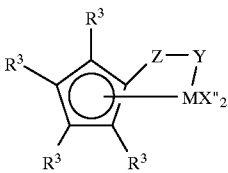

wherein:
M is titanium or zirconium in the +2 or +4 formal oxidation state;
$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative thereby forming a fused ring system,
each X" is a halo, hydrocarbyl, hydrocarbyloxy or silyl group, said group having up to 20 non-hydrogen atoms, or two X" groups together form a neutral $C_{5-30}$ conjugated diene or a divalent derivative thereof;
Y is —O—, —S—, —NR*—, —PR*—; and
Z is $SiR^*_2$, $CR^*_2$, $SiR^*_2SiR^*_2$, $CR^*_2CR^*_2$, $CR^*=CR^*$, $CR^*_2SiR^*_2$, or $GeR^*_2$, wherein: R* is as previously defined.

Illustrative (not necessarily preferred) Group 4 metal complexes that may be employed in the practice of the present invention include:
cyclopentadienyltitaniumtrimethyl,
cyclopentadienyltitaniumtriphenyl,
cyclopentadienyltitaniumtribenzyl,
cyclopentadienyltitaniumdimethylmethoxide,
cyclopentadienyltitaniumdimethylchloride,
pentamethylcyclopentadienyltitaniumtrimethyl,
indenyltitaniumtrimethyl,
indenyltitaniumtriphenyl,
tetrahydroindenyltitaniumtribenzyl,
pentamethylcyclopentadienyltitaniumtribenzyl,
pentamethylcyclopentadienyltitaniumdimethylmethoxide,
pentamethylcyclopentadienyltitaniumdimethylchloride,
($\eta^5$-2,4-dimethylpentadienyl)titaniumtrimethyl,
octahydrofluorenyltitaniumtrimethyl,
tetrahydroindenyltitaniumtrimethyl,
tetrahydrofluorenyltitaniumtrimethyl,
(1,1-dimethyl-2,3,4,9,10-η-1,4,5,6,7,8-hexahydronaphthalenyl) titaniumtrimethyl,
(1,1,2,3-tetramethyl-2,3,4,9,10-η-1,4,5,6,7,8-hexahydronaphthalenyl)titaniumtrimethyl,
(tert-butylamido) (tetramethyl-$\eta^5$-cyclopentadienyl) dimethylsilanetitanium dibenzyl,
(tert-butylamido) (tetramethyl-$\eta^5$-cyclopentadienyl) dimethyl-silanetitanium dimethyl,
(tert-butylamido) (tetramethyl-$\eta^5$-cyclopentadienyl)-1,2-ethanediyltitanium dimethyl,
(tert-butylamido) (tetramethyl-$\eta^5$-indenyl) dimethylsilanetitanium dimethyl,
(tert-butylamido) (tetramethyl-$\eta^5$-cyclopentadienyl)-dimethylsilane titanium (III) 2-(dimethylamino)benzyl;
(tert-butylamido) (tetramethyl-$\eta^5$-cyclopentadienyl) dimethyl-silanetitanium (III) allyl,
(tert-butylamido) (tetramethyl-$\eta^5$-cyclopentadienyl) dimethyl-silanetitanium (III) 2,4-dimethylpentadienyl,
(tert-butylamido) (tetramethyl-$\eta^5$-cyclopentadienyl) dimethyl-silanetitanium (II) 1,4-diphenyl-1,3-butadiene,
(tert-butylamido) (tetramethyl-$\eta^5$-cyclopentadienyl) dimethyl-silanetitanium (II) 1,3-pentadiene,
(tert-butylamido)(2-methylindenyl)dimethylsilanetitanium (II) 1,4-diphenyl-1,3-butadiene,
(tert-butylamido)(2-methylindenyl)dimethylsilanetitanium (II) 2,4-hexadiene,
(tert-butylamido)(2-methylindenyl)dimethylsilanetitanium (IV) 2,3-dimethyl-1,3-butadiene,
(tert-butylamido)(2-methylindenyl)dimethylsilanetitanium (IV) isoprene,
(tert-butylamido)(2-methylindenyl)dimethylsilanetitanium (IV) 1,3-butadiene,
(tert-butylamido)(2,3-dimethylindenyl)-dimethylsilanetitanium (IV) 2,3-dimethyl-1,3-butadiene,
(tert-butylamido)(2,3-dimethylindenyl) dimethylsilanetitanium (IV) isoprene,
(tert-butylamido)(2,3-dimethylindenyl) dimethylsilanetitanium (IV) dimethyl,
(tert-butylamido)(2,3-dimethylindenyl) dimethylsilanetitanium (IV) dibenzyl,
(tert-butylamido)(2,3-dimethylindenyl) dimethylsilanetitanium (IV) 1,3-butadiene,
(tert-butylamido)(2,3-dimethylindenyl) dimethylsilanetitanium (II) 1,3-pentadiene,
(tert-butylamido)(2,3-dimethylindenyl) dimethylsilanetitanium (II) 1,4-diphenyl-1,3-butadiene,
(tert-butylamido)(2-methylindenyl)dimethylsilanetitanium (II) 1,3-pentadiene,
(tert-butylamido)(2-methylindenyl)dimethylsilanetitanium (IV) dimethyl,
i(tert-butylamido)(2-methylindenyl)dimethylsilanetitanium (IV) dibenzyl,
(tert-butylamido)(2-methyl-4-phenylindenyl) dimethylsilane-titanium (II) 1,4-diphenyl-1,3-butadiene,
(tert-butylamido)(2-methyl-4-phenylindenyl) dimethylsilane-titanium (II) 1,3-pentadiene,
(tert-butylamido)(2-methyl-4-phenylindenyl) dimethylsilane-titanium (II) 2,4-hexadiene,
(tert-butylamido) (tetramethyl-$\eta^5$-cyclopentadienyl) dimethyl-silanetitanium (IV) 1,3-butadiene,
(tert-butylamido) (tetramethyl-$\eta^5$-cyclopentadienyl) dimethyl-silanetitanium (IV) 2,3-dimethyl-1,3-butadiene,
(tert-butylamido) (tetramethyl-$\eta^5$-cyclopentadienyl) dimethyl-silanetitanium (IV) isoprene, (tert-butylamido) (tetramethyl-η⁵cyclopentadienyl) dimethyl-silanetitanium (II) 1,4-dibenzyl-1,3-butadiene,
(tert-butylamido) (tetramethyl-η⁵-cyclopentadienyl) dimethyl-silanetitanium (II) 2,4-hexadiene,
(tert-butylamido) (tetramethyl-η⁵-cyclopentadienyl) dimethyl-silanetitanium (II) 3-methyl-1,3-pentadiene,
(tert-butylamido)(2,4-dimethylpentadien-3-yl)dimethyl-silanetitaniumdimethyl,
(tert-butylamido)(6,6-dimethylcyclohexadienyl)dimethyl-silanetitaniumdimethyl,
(tert-butylamido)(1,1-dimethyl-2,3,4,9,10-η-1,4,5,6,7,8-hexahydronaphthalen-4-yl) dimethylsilanetitaniumdimethyl,
(tert-butylamido)(1,1,2,3-tetramethyl-2,3,4,9,10-η-1,4,5,6,7,8-hexahydronaphthalen-4-yl)dimethylsilanetitanium-dimethyl,
(tert-butylamido) (tetramethyl-η⁵-cyclopentadienyl methylphenyl-silanetitanium (IV) dimethyl,
(tert-butylamido) (tetramethyl-η⁵-cyclopentadienyl methylphenyl-silanetitanium (II) 1,4-diphenyl-1,3-butadiene,
1-(tert-butylamido)-2-(tetramethyl-η⁵-cyclopentadienyl)-ethanediyltitanium (IV) dimethyl, and
1-(tert-butylamido)-2-(tetramethyl-5-cyclopentadienyl)-ethanediyl-titanium (II) 1,4-diphenyl-1,3-butadiene.

Complexes containing two L groups including bridged complexes suitable for use in the present invention include:
bis(cyclopentadienyl)zirconiumdimethyl,
bis(cyclopentadienyl)zirconium dibenzyl,
bis(cyclopentadienyl)titaniumdiphenyl,
bis(cyclopentadienyl)titanium-allyl,
bis(cyclopentadienyl)titaniummethylmethoxide,
bis(cyclopentadienyl)titaniummethylchloride,
bis(pentamethylcyclopentadienyl)titaniumdimethyl,
bis(indenyl)titaniumdimethyl,
bis(indenyl)titaniummethyl(2-(dimethylamino)benzyl),
bis(indenyl)titanium methyltrimethylsilyl,
bis(tetrahydroindenyl)titanium methyltrimethylsilyl,
bis(pentamethylcyclopentadienyl)titaniumdibenzyl,
bis(pentamethylcyclopentadienyl) titaniummethylmethoxide,
bis(pentamethylcyclopentadienyl)titaniummethylchloride,
bis(methylethylcyclopentadienyl)zirconiumdimethyl,
bis(butylcyclopentadienyl)zirconium dibenzyl,
bis(t-butylcyclopentadienyl)zirconiumdimethyl,
bis(ethyltetramethylcyclopentadienyl)zirconiumdimethyl,
bis(methylpropylcyclopentadienyl)zirconium dibenzyl,
bis(trimethylsilylcyclopentadienyl)zirconium dibenzyl,
dimethylsilyl-bis(cyclopentadienyl)zirconiumdimethyl,
dimethylsilyl-bis(tetramethylcyclopentadienyl)titanium (III) allyl,
dimethylsilyl-bis(t-butylcyclopentadienyl) zirconiumdichloride,
dimethylsilyl-bis(n-butylcyclopentadienyl) zirconiumdichloride,
(methylene-bis(tetramethylcyclopentadienyl)titanium(III) 2-(dimethylamino)benzyl,
(methylene-bis(n-butylcyclopentadienyl)titanium(III) 2-(dimethylamino)benzyl,
dimethylsilyl-bis(indenyl)zirconiumbenzylchloride,
dimethylsilyl-bis(2-methylindenyl)zirconiumdimethyl,
dimethylsilyl-bis(2-methyl-4-phenylindenyl) zirconiumdimethyl,
dimethylsilyl-bis(2-methylindenyl)zirconium-1,4-diphenyl-1,3-butadiene,
dimethylsilyl-bis(2-methyl-4-phenylindenyl)zirconium (II) 1,4-diphenyl-1,3-butadiene,
dimethylsilyl-bis(tetrahydroindenyl)zirconium(II) 1,4-diphenyl-1,3-butadiene,
dimethylsilyl-bis(fluorenyl)zirconiummethylchloride,
dimethylsilyl-bis(tetrahydrofluorenyl)zirconiumbis-(trimethylsilyl),
(isopropylidene)(cyclopentadienyl)(fluorenyl)zirconium-dibenzyl, and
dimethylsilyltetramethylcyclopentadienylfluorenyl) zirconium-dimethyl.

Other complexes, catalysts and catalyst systems, especially complexes containing other Group 4 metals, will, of course, be apparent to those skilled in the art who have the benefits of the teachings of this disclosure.

Suitable cocatalysts for use to the present invention include, for example, but are not limited to, polymeric or oligomeric aluminoxanes, especially methylaluminoxane or modified methylaluminoxane (made, for example, as described in U.S. Pat. Nos. 5,041,584; 4,544,762; 5,015,749; 5,041,583; 5,086,024; 5,084,585; 4,960,878 and/or 5,041,585) as well as inert, compatible, non-coordinating, ion forming compounds. Preferred cocatalysts are inert, non-coordinating, boron compounds.

The homogeneous catalysts useful in the present invention may also be supported on an inert support. Typically, the support can be any solid, particularly porous supports such as talc or inorganic oxides, or resinous support materials such as a polyolefin. Preferably, the support material is an inorganic oxide in finely divided form.

Suitable inorganic oxide materials which are desirably employed in accordance with this invention include Group IIA, IIIA, IVA, or IVB metal oxides such as silica. alumina, and silica-alumina and mixtures thereof. Other inorganic oxides that may be employed either alone or in combination with the silica, alumina or silica-alumina are magnesia, titania, zirconia, and the like. Other suitable support materials, however, can be employed, for example, finely divided polyolefins such as finely divided polyethylene.

The heterogeneous catalysts suitable for use in the present invention are typical supported, Ziegler-type catalysts which are particularly useful at the relatively high polymerization temperatures. Examples of such compositions are those derived from organomagnesium compounds, alkyl halides or aluminum halides or hydrogen chloride, and a transition metal compound. Examples of such catalysts are described in U.S. Pat Nos. 4,314,912 (Lowery, Jr. et al.), 4,547,475 (Glass et al.), and 4,612,300 (Coleman, III), the teachings of which are incorporated herein by reference.

Particularly suitable organomagnesium compounds include, for example, hydrocarbon soluble dihydrocarbyl-magnesium such as the magnesium dialkyls and the magnesium diaryls. Exemplary suitable magnesium dialkyls include particularly n-butyl-sec-butylmagnesium, diisopropylmagnesium, di-n-hexylmagnesium, isopropyl-n-butyl-magnesium, ethyl-n-hexylmagnesium, ethyl-n-butylmagnesium, di-n-octylmagnesium and others wherein the alkyl has from 1 to 20 carbon atoms. Exemplary suitable magnesium diaryls include diphenylmagnesium, dibenzyl-magnesium and ditolylmagnesium. Suitable organomagnesium compounds include alkyl and aryl magnesium alkoxides and aryloxides and aryl and alkyl magnesium halides with the halogen-free organomagnesium compounds being more desirable.

Among the halide sources which can be employed herein are the active non-metallic halides, metallic halides, and hydrogen chloride.

Suitable non-metallic halides are represented by the formula R'X wherein R' is hydrogen or an active monovalent organic radical and X is a halogen. Particularly suitable non-metallic halides include, for example, hydrogen halides and active organic halides such as t-alkyl halides, allyl halides, benzyl halides and other active hydrocarbyl halides wherein hydrocarbyl is as defined hereinbefore. By an active organic halide is meant a hydrocarbyl halide that contains a labile halogen at least as active, i.e., as easily lost to another compound, as the halogen of sec-butyl chloride, preferably as active as t-butyl chloride. In addition to the organic monohalides, it is understood that organic dihalides, trihalides and other polyhalides that are active as defined hereinbefore are also suitably employed. Examples of preferred active non-metallic halides include hydrogen chloride, hydrogen bromide, t-butyl chloride, t-amyl bromide, benzyl chloride, α-phenylethyl bromide, diphenyl methyl chloride and the like. Most preferred are hydrogen chloride, t-butyl chloride, allyl chloride and benzyl chloride.

Suitable metallic halides which can be employed herein include those represented by the formula $MR_{y-a}X_a$ wherein:

M is a metal of Groups IIB, IIIA or IVA of Mendeleev's Periodic Table of Elements, R is a monovalent organic radical, X is a halogen, Y has a value corresponding to the valence of M, and a has a value from 1 to y.

Preferred metallic halides are aluminum halides of the formula $AlR_{3-a}X_a$ wherein:

each R is independently hydrocarbyl as hereinbefore defined such as alkyl,

X is a halogen and a is a number from 1 to 3.

Most preferred are alkylaluminum halides such as ethylaluminum sesquichloride, diethylaluminum chloride, ethylaluminum dichloride, and diethylaluminum bromide, with ethylaluminum dichloride being especially preferred. Alternatively, a metal halide such as aluminum trichloride or a combination of aluminum trichloride with an alkyl aluminum halide or a trialkyl aluminum compound may be suitably employed.

It is understood that the organic moieties of the aforementioned organomagnesium, e.g., R", and the organic moieties of the halide source, e.g., R and R', are suitably any other organic radical provided that they do not contain functional groups that poison conventional Ziegler catalysts.

The magnesium halide can be pre-formed from the organomagnesium compound and the halide source or it can be formed in situ in which instance the catalyst is preferably prepared by mixing in a suitable solvent or reaction medium (1) the organomagnesium component and (2) the halide source, followed by the other catalyst components.

Any of the conventional Ziegler-Natta transition metal compounds can be usefully employed as the transition metal component in preparing the supported catalyst component. Typically, the transition metal component is a compound of a Group IVB, VB, or VIB metal. The transition metal component is generally, represented by the formulas: $TrX'_{4-q}(OR^1)_q$, $TrX'_{4-q}R^2_q$, $VOX'3$ and $VO(OR^1)_3$.

Tr is a Group IVB, VB, or VIB metal, preferably a Group IVB or VB metal, preferably titanium, vanadium or zirconium, q is 0 or a number equal to or less than 4, X' is a halogen, and $R^1$ is an alkyl group, aryl group or cycloalkyl group having from 1 to 20 carbon atoms, and $R^2$ is an alkyl group, aryl group, aralkyl group, substituted aralkyls, and the like. The aryl, aralkyls and substituted aralkyls contain 1 to 20 carbon atoms, preferably 1 to 10 carbon atoms. When the transition metal compound contains a hydrocarbyl group, $R^2$, being an alkyl, cycloalkyl, aryl, or aralkyl group, the hydrocarbyl group will preferably not contain an H atom in the position beta to the metal carbon bond. Illustrative but non-limiting examples of aralkyl groups are methyl, neo-pentyl, 2,2-dimethylbutyl, 2,2-dimethylhexyl; aryl groups such as benzyl; cycloalkyl groups such as 1-norbornyl. Mixtures of these transition metal compounds can be employed if desired.

Illustrative examples of the transition metal compounds include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_8H_{17})_2Br_2$, and $Ti(OC_{12}H_{25})Cl_3$, $Ti(O-i-C_3H_7)_4$, and $Ti(O-n-C_4H_9)_4$.

Illustrative examples of vanadium compounds include $VCl_4$, $VOCl_3$, $VO(OC_2H_5)_3$, and $VO(OC_4H_9)_3$.

Illustrative examples of zirconium compounds include $ZrCl_4$, $ZrCl_3(OC_2H_5)$, $ZrCl_2(OC_2H_5)_2$, $ZrCl(OC_2H_5)_3$, $Zr(OC_2H_5)_4$, $ZrCl_3(OC_4H_9)$, $ZrCl_2(OC_4H_9)_2$, and $ZrCl(OC_4H_9)_3$.

As indicated above, mixtures of the transition metal compounds may be usefully employed, no restriction being imposed on the number of transition metal compounds which may be contracted with the support. Any halogenide and alkoxide transition metal compound or mixtures thereof can be usefully employed. The previously named transition metal compounds are especially preferred with vanadium tetachloride, vanadium oxychloride, titanium tetraisopropoxide, titanium tetrabutoxide, and titanium tetrachloride being most preferred.

Suitable catalyst materials may also be derived from a inert oxide supports and transition metal compounds. Examples of such compositions suitable for use in the solution polymerization process are described U.S. Pat. No. 5,420,090 and 5,231,151, the teachings of both of which are incorporated herein by reference.

The inorganic oxide support used in the preparation of the catalyst may be any particulate oxide or mixed oxide as previously described which has been thermally or chemically dehydrated such that it is substantially free of adsorbed moisture.

The specific particle size, surface area, pore volume, and number of surface hydroxyl groups characteristic of the inorganic oxide are not critical to its utility in the practice of the invention. However, since such characteristics determine the amount of inorganic oxide to be employed in preparing the catalyst compositions, as well as affecting the properties of polymers formed with the aid of the catalyst compositions, these characteristics must frequently be taken into consideration in choosing an inorganic oxide for use in a particular aspect of the invention. In general, optimum results are usually obtained by the use of inorganic oxides having an average particle size in the range of about 1 to 100 microns, preferably about 2 to 20 microns; a surface area of about 50 to 1,000 square meters per gram, preferably about 100 to 400 square meters per gram; and a pore volume of about 0.5 to 3.5 cm³ per gram; preferably about 0.5 to 2 cm³ per gram.

In order to further improve catalyst performance, surface modification of the support material may be desired. Surface modification is accomplished by specifically treating the support material such as silica, aluminia or silica-alumina with an organometallic compound having hydrolytic character. More particularly, the surface modifying agents for the support materials comprise the organometallic compounds of the metals of Group IIA and IIIA of the Periodic Table. Most preferably the organometallic compounds are selected from magnesium and aluminum organometallics and especially from magnesium and aluminum alkyls or mixtures thereof represented by the formulas and $R^1MgR^2$ and $R_1R^2AlR^3$ wherein each of $R^1$, $R^2$ and $R^3$ which may be the same or different are alkyl groups, aryl groups, cycloalkyl groups, aralkyl groups, alkoxide groups, alkadienyl groups or alkenyl groups. The hydrocarbon groups $R^1$, $R^2$ and $R^3$ can contain between 1 and 20 carbon atoms and preferably from 1 to about 10 carbon atoms.

The surface modifying action is effected by adding the organometallic compound in a suitable solvent to a slurry of the support material. Contact of the organometallic compound in a suitable solvent and the support is maintained from about 30 to 180 minutes and preferably form 60 to 90 minutes at a temperature in the range of 20° to 100° C. The diluent employed in slurrying the support can be any of the solvents employed in solubilizing the organometallic compound and is preferably the same.

A preferred embodiment of the present invention is the use of any novel polymerization system described herein to prepare homogeneously branched ethylene polymers, such as, for example, homogeneously branched linear ethylene alpha-olefin interpolymers as described by Elston in U.S. Pat. No. 3,645,992 or homogeneously branched substantially linear ethylene polymers as described by Lai et al. in U.S. Pat. Nos. 5,272,236 and 5,278,272, the disclosures of all three of which are incorporated herein by reference. Suitable alpha-olefins for interpolymerizing with ethylene are represented by the following formula:

where R is a hydrocarbyl radical and may be a hydrocarbyl radical having from one to twenty carbon atoms. Such alpha-olefin monomers include, but are not limited to, propylene, 1-butene, 1-pentene, 1-hexene, 4-methyl-1-pentene, 1-heptene, 1-decene and 1-octene, as well as other monomer types such as styrene, alkyl-substituted styrenes, vinyl benzocyclobutane, dienes such as 1,4-hexadiene, 1,7-octadiene, 1,9-decadiene, and ethylidene norbornene and cycloalkenes (e.g., cyclopentene, cyclohexene and cyclooctene). Preferred homogeneously branched ethylene alpha-olefin interpolymers are homogeneously branched substantially linear ethylene alpha-olefin interpolymers and a homogeneously branched substantially linear ethylene/1-octene copolymer is particularly preferred. Another preferred embodiment of the present invention is the use of the novel polymerization system to prepare polymer blends comprising at least one homogeneously branched ethylene interpolymer and at least one heterogeneously branched ethylene interpolymer or homogeneously branched ethylene polymer, particularly preferred is a polymer blend comprising at least one homogeneously branched substantially linear ethylene alpha-olefin interpolymer and most preferred is a polymer blend comprising at least one homogeneously branched substantially linear ethylene/1-octene copolymer and at least one heterogeneously branched linear ethylene/1-octene copolymer.

The term "homogeneously branched" is used in the conventional sense in reference to an ethylene interpolymer in which the comonomer is randomly distributed within a given polymer molecule and wherein substantially all of the polymer molecules have the same ethylene to comonomer molar ratio. The term refers to an ethylene interpolymer that is characterized by a relatively high short chain branching distribution index (SCBDI) or composition distribution branching index (CDBI). That is, the interpolymer has a SCBDI greater than or equal to about 50 percent, preferably greater than or equal to about 70 percent, more preferably greater than or equal to about 90 percent and essentially lacks a measurable high density (crystalline) polymer fraction.

SCBDI is defined as the weight percent of the polymer molecules having a comonomer content within 50 percent of the median total molar comonomer content and represents a comparison of the monomer distribution in the interpolymer to the monomer distribution expected for a Bernoullian distribution. The SCBDI of an interpolymer can be readily calculated from data obtained from techniques known in the art, such as, for example, temperature rising elution fractionation (abbreviated herein as "TREF") as described, for example, by Wild et al., *Journal of Polymer Science, Poly. Phys. Ed.*, Vol. 20, p. 441 (1982), or in U.S. Pat. Nos. 4,798,081; 5,008,204; or 5,322,728; or by L. D. Cady, "The Role of Comonomer Type and Distribution in LLDPE Product Performance," SPE Regional Technical Conference, Quaker Square Hilton, Akron, Ohio, October 1–2, pp. 107–119 (1985), the disclosures of all which are incorporated herein by reference. However, the preferred TREF technique does not include purge quantities in SCBDI calculations. More preferably, the monomer distribution of the interpolymer and SCBDI are determined using $^{13}$C NMR analysis in accordance with techniques described in U.S. Pat. No. 5,292,845 and by J. C. Randall in Rev. Macromol. Chem. Phys., C29, pp. 201–317, the disclosures of both of which are incorporated herein by reference.

The term "heterogeneously branched" is used herein in the conventional sense in reference to a linear ethylene interpolymer having a comparatively low short chain branching distribution index (SCBDI) or composition distribution branching index (CDBI). That is, the interpolymer has a relatively broad short chain branching distribution. Heterogeneously branched linear ethylene interpolymers have a SCBDI less than about 50 percent and more typically less than about 30 percent.

The term "homogeneously branched linear ethylene interpolymer" means that the interpolymer has a homogeneous (or narrow) short branching distribution (i.e., the polymer has a relatively high SCBDI or CDBI) but does not have long chain branching. That is, the ethylene interpolymer has an absence of long chain branching and a linear polymer backbone in the conventional sense of the term "linear." Such interpolymers can include linear low density polyethylene (LLDPE), ultra (or very) low density polyethylene (ULDPE or VLDPE) and high density polyethylene (HDPE) polymers and can be made using catalyst systems (e.g., as described by Elston in U.S. Pat. No. 3,645,992) which provide uniform (narrow) short branching distribution (i.e., homogeneously branched). Elston uses soluble vanadium catalyst systems to make such polymers, however others such as Mitsui Chemical Corporation and Exxon Chemical Company have used so-called single site catalyst systems to make polymers having a similar homogeneous structure. Homogeneously branched linear ethylene interpolymers can be prepared using the present novel polymerization system by employing hafnium, zirconium, titanium, vanadium or metallocene catalyst systems or combinations thereof. Ewen et al. in U.S. Pat. No. 4,937,299 describe a metallocene catalyst system that is thought to be suitable in the present polymerization system for preparing homogeneously branched linear ethylene interpolymers. The disclosures of Elston and Ewen et al. are incorporated herein by reference.

The term "homogeneously branched linear ethylene interpolymer" does not refer to high pressure branched polyethylene which is known to those skilled in the art to have numerous long chain branches.

Typically, the homogeneously branched linear ethylene interpolymer is an ethylene/α-olefin interpolymer, wherein the α-olefin is at least one $C_3$–$C_{20}$ α-olefin (e.g., propylene, 1-butene, 1-pentene, 4-methyl-1-pentene, 1-hexene, 1-octene and the like), preferably wherein at least one of the α-olefins is 1-octene. Most preferably, the ethylene/α-olefin interpolymer is a copolymer of ethylene and a $C_3$–$C_{20}$ α-olefin, especially an ethylene/$C_4$–$C_6$ α-olefin copolymer. Commercial examples of homogeneously branched linear ethylene/a-olefin interpolymers made by known polymerization systems are sold by Mitsui Chemical under the designation "TAFMER" and by Exxon Corporation under the designation "EXACT".

Heterogeneously branched VLDPE and LLDPE are well known among practitioners of the linear polyethylene art. The present polymerization system can be used to prepare heterogeneously branched VLDPE and LLDPE resins by employing conventional Ziegler-Natta coordination metal catalysts as described, for example, by Anderson et al. in U.S. Pat. No. 4,076,698, the disclosure of which is incorporated herein by reference. These conventional Ziegler-type linear polyethylenes are not homogeneously branched, do not have any long-chain branching and have a linear polymer backbone in the conventional sense of the term "linear."

The terms "ultra low density polyethylene" (ULDPE), "very low density polyethylene" (VLDPE) and "linear very low density polyethylene" (LVLDPE) have been used interchangeably in the polyethylene art to designate the polymer subset of linear low density polyethylenes having a density less than or equal to 0.915 g/cc. The term "linear low density polyethylene" (LLDPE) is then applied to those linear polyethylenes having a density above 0.915 g/cc. As used herein, and in the conventional sense, these terms indicate that the polymer has a linear polymer backbone. Commercial examples of heterogeneously branched VLDPE resins include ATTANETM ULDPE polymers supplied by The Dow Chemical Company and FLEXOMERTM VLDPE polymers supplied by Union Carbide Corporation.

The term "substantially linear ethylene polymer" is used herein to refer to homogeneously branched ethylene homopolymers, copolymers and other interpolymers that contain long chain branches as well as short chain branches attributable to homogeneous comonomer incorporation. The long chain branches are of the same structure as the backbone of the polymer and are longer than the short chain branches. The polymer backbone of substantially linear polymers is substituted with an average of 0.01 to 3 long chain branch/1000 carbons. Preferred substantially linear polymers for use in the invention are substituted with from 0.01 long chain branch/1000 carbons to 1 long chain branch/1000 carbons, and more preferably from 0.05 long chain branch/1000 carbons to 1 long chain branches/1000 carbons.

Long chain branching is defined herein as a chain length of at least 6 carbons, above which the length cannot be distinguished using $^{13}C$ nuclear magnetic resonance spectroscopy. The long chain branch can be as long as about the same length as the length of the polymer backbone to which it is attached. Long chain branches are obviously of greater ength than of short chain branches resulting from comonomer incorporation.

The presence of long chain branching can be determined in ethylene homopolymers by using $^{13}C$ nuclear magnetic resonance (NMR) spectroscopy and is quantified using the method described by Randall (*Rev. Macromol. Chem. Phys.*, C29, V. 2 & 3, p. 285–297).

As a practical matter, conventional $^{13}C$ nuclear magnetic resonance spectroscopy cannot determine the length of a long chain branch in excess of six carbon atoms. However, there are other known techniques useful for determining the presence of long chain branches in ethylene polymers, including ethylene/1-octene interpolymers. Two such methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, for example, Zimm, G.H. and Stockmayer, W. H., J. Chem. Phys., 17, 1301 (1949) and Rudin, A., *Modern Methods of Polymer Characterization*, John Wiley & Sons, New York (1991) pp. 103–112.

A. Willem deGroot and P. Steve Chum, both of The Dow Chemical Company, at the Oct. 4, 1994 conference of the Federation of Analytical Chemistry and Spectroscopy Society (FACSS) in St. Louis, Mo., presented data demonstrating that GPC-DV is a useful technique for quantifying the presence of long chain branches in substantially linear ethylene polymers. In particular, deGroot and Chum found that the level of long chain branches in substantially linear ethylene homopolymer samples measured using the Zimm-Stockmayer equation correlated well with the level of long chain branches measured using $^{13}C$ NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/octene copolymers.

deGroot and Chum also showed that a plot of $Log(I_2, Melt Index)$ as a function of Log(GPC Weight Average Molecular Weight) as determined by GPC-DV illustrates that the long chain branching aspects (but not the extent of long branching) of substantially linear ethylene polymers are comparable to that of high pressure, highly branched low density polyethylene (LDPE) and are clearly distinct from ethylene polymers produced using Ziegler-type catalysts such as titanium complexes and ordinary homogeneous catalysts such as hafnium and vanadium complexes.

Substantially linear ethylene polymers are considered to be a unique class of compounds as described in U.S. Pat. No. 5,272,236 and in U.S. Pat. No. 5,278,272, each of which is incorporated herein by reference.

Substantially linear ethylene polymers differ significantly from the class of polymers conventionally known as homogeneously branched linear ethylene polymers described, for example, by Elston in U.S. Pat. No. 3,645,992. Substantially linear ethylene polymers also differ significantly from the class of polymers known conventionally as heterogeneously branched traditional Ziegler polymerized linear ethylene interpolymers (for example, ultra low density polyethylene, linear low density polyethylene or high density polyethylene made, for example, using the technique disclosed by Anderson et al. in U.S. Pat. No. 4,076,698 and utilized by Golike as described in U.S. Pat. No. 4,597,920, the disclosures of both of which are incorporated by reference), in that substantially linear ethylene polymers are homogeneously branched polymers. Substantially linear ethylene polymers also differ significantly from the class known as free-radical initiated highly branched high pressure low density ethylene homopolymer and ethylene interpolymers such as, for example, ethylene-acrylic acid (EAA) copolymers and ethylene-vinyl acetate (EVA) copolymers.

The polymerization conditions for manufacturing substantially linear ethylene polymers according to the present invention comprise a continuous solution polymerization process (as opposed to batch operation), although the present novel solution polymerization system is not limited thereto. In general, to polymerize the substantially linear interpolymers, homogenous catalysts mentioned earlier can be used, but for substantially linear ethylene polymers, the polymerization process should be operated such that substantially linear ethylene polymers are formed. That is, not all polymerization conditions and/or homogeneous catalyst systems inherently make substantially linear ethylene polymers.

Substantially linear ethylene polymers prepared by the present invention are generally characterized as having (a) a melt flow ratio, $I_{10}/I_2$, $\geq 5.63$, (b) a molecular weight distribution, $M_w/M_n$, as determined by gel permeation chromatography and defined by the equation:

$$(M_w/M_n) \leq (I_{10}/I_2) - 4.63,$$

(c) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the linear ethylene polymer has an $I_2$ and $M_w/M_n$ within ten percent of the substantially linear ethylene polymer and wherein the respective critical shear rates of the substantially linear ethylene polymer and the linear ethylene polymer are measured at the same melt temperature using a gas extrusion rheometer, (d) a single differential scanning calorimetry, DSC, melting peak between −30 and 140° C., and (e) a SCBDI greater than or equal to about 50 percent.

The substantially linear ethylene polymers prepared by use of the present invention are homogeneously branched polymers and essentially lack a measurable "high density" fraction as measured by the TREF technique (i.e., have a narrow short chain distribution and a high SCBD index). The substantially linear ethylene polymer generally do not contain a polymer fraction with a degree of branching less than or equal to 2 methyls/1000 carbons. The "high density polymer fraction" can also be described as a polymer fraction with a degree of branching less than about 2 methyls/1000 carbons.

Determination of the critical shear rate and critical shear stress in regards to melt fracture as well as other rheology properties such as "rheological processing index" (PI), is performed using a gas extrusion rheometer (GER). The gas extrusion rheometer is described by M. Shida, R N Shroff and L. V. Cancio in *Polymer Engineering Science*, Vol. 17, No. 11, p. 770 (1977), and in "Rheometers for Molten Plastics" by John Dealy, published by Van Nostrand Reinhold Co. (1982) on pp. 97–99. GER experiments are performed at a temperature of about 190° C., at nitrogen pressures between about 250 to about 5500 psig using about a 0.754 mm diameter, 20:1 L/D die with an entrance angle of about 180°. For substantially linear ethylene polymers, the PI is the apparent viscosity (in kpoise) of a material measured by GER at an apparent shear stress of about $2.15 \times 10^6$ dyne/cm$^2$. Substantially linear ethylene are ethylene interpolymers having a PI in the range of about 0.01 kpoise to about 50 kpoise, preferably about 15 kpoise or less. The substantially linear ethylene polymers prepared herein have a PI less than or equal to about 70 percent of the PI of a linear ethylene polymer (either a conventional Ziegler polymerized linear ethylene polymer or a linear homogeneously branched linear ethylene polymer as described by Elston in U.S. Pat. No. 3,645,992) having an $I_2$ and $M_w/M_n$, each within ten percent of the substantially linear ethylene polymer.

An apparent shear stress versus apparent shear rate plot is used to identify the melt fracture phenomena and quantify the critical shear rate and critical shear stress of ethylene polymers. According to Ramamurthy in the *Journal of Rheology*, 30 (2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." Herein, as determined using the above-described GER, the onset of surface melt fracture (OSMF) is characterized at the beginning of losing extrudate gloss at which the surface roughness of the extrudate can only be detected by 40× magnification. As described in U.S. Pat. No. 5,278,2772, the critical shear rate at the onset of surface melt fracture for the substantially linear ethylene polymers is at least about 50 percent greater than the critical shear rate at the onset of surface melt fracture of a linear ethylene interpolymer having essentially the same $I_2$ and $M_w/M_n$.

Gross melt fracture occurs at unsteady extrusion flow conditions and ranges in detail from regular (alternating rough and smooth, helical, etc.) to random distortions. For commercial acceptability and maximum abuse properties of films, coatings and profiles, surface defects should be minimal, if not absent. The critical shear stress at the onset of gross melt fracture for the substantially linear ethylene polymers is greater than about $4 \times 10^6$ dynes/cm$^2$. The critical shear rate at the onset of surface melt fracture (OSMF) and the onset of gross melt fracture (OGMF) will be used herein based on the changes of surface roughness and configurations of the extrudates extruded by a GER.

Substantially linear ethylene polymers, like other homogeneously branched ethylene polymers that consist of a single polymer component material, are characterized by a single DSC melting peak. The single melting peak is determined using a differential scanning calorimeter standardized with indium and deionized water. The method involves about 5–7 mg sample sizes, a "first heat" to about 150° C. which is held for about 4 minutes, a cool down at about 10°/min. to about −30° C. which is held for about 3 minutes, and heat up at about 10° C./min. to about 140° C. for the "second heat". The single melting peak is taken from the "second heat" heat flow vs. temperature curve. Total heat of fusion of the polymer is calculated from the area under the curve.

For substantially linear ethylene polymers having a density of about 0.875 g/cc to about 0.91 g/cc, the single melting peak may show, depending on equipment sensitivity, a "shoulder" or a "hump" on the low melting side that constitutes less than about 12 percent, typically, less than about 9 percent, and more typically less than about 6 percent of the total heat of fusion of the polymer. Such an artifact is observable for known homogeneously branched polymers such as Exact™ resins and is discerned on the basis of the slope of the single melting peak varying monotonically through the melting region of the artifact. Such an artifact occurs within about 34° C., typically within about 27° C., and more typically within about 20° C. of the melting point of the single melting peak. The heat of fusion attributable to an artifact can be separately determined by specific integration of its associated area under the heat flow vs. temperature curve.

Whole polymer product samples and individual polymer components are analyzed by gel permeation chromatography (GPC) on a Waters 150 high temperature chromatographic unit equipped with mixed porosity columns, operating at a system temperature of 140° C. The solvent is 1,2,4-trichlorobenzene, from which 0.3 percent by weight solutions of the samples are prepared for injection. The flow rate is 1.0 milliliters/minute and the injection size is 100 microliters.

The molecular weight determination with is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621, 1968) to derive the following equation:

$$M_{polyethylene} = a * (M_{polystyrene})^b.$$

In this equation, a=0.4316 and b=1.0. Weight average molecular weight, $M_w$, and number average molecular weight, $M_n$, are calculated in the usual manner according to the following formula: $M_j = (\Sigma w_i (M_i^j))^j$; where $w_i$ is the weight fraction of the molecules with $M_i$ eluting from the GPC column in fraction i and j=1 when calculating $M_w$ and j=−1 when calculating $M_n$.

For the homogeneously branched ethylene polymers made by the present invention (as single polymer compositions rather than as polymer blends or composites as in the instance of employing two flow loops with catalyst injection in each), the $M_w/M_n$ is preferably less than about 3, more preferably less than about 2.5, and especially from about 1.5 to about 2.5 and most especially from about 1.8 to about 2.3.

As described in U.S. Pat. Nos. 5,272,236 and 5,278,272 by Lai et al., substantially linear ethylene polymers are known to have excellent processability, despite having a relatively narrow molecular weight distribution (that is, the $M_w/M_n$ ratio is typically less than about 3.5, preferably less than about 2.5, and more preferably about 2). Unlike homogeneously and heterogeneously branched linear ethylene polymers, the melt flow ratio ($I_{10}/I_2$) of substantially linear ethylene polymers can be varied essentially independently of the molecular weight distribution, $M_w/M_n$. Accordingly, the present novel solution polymerization system and process is preferably used to make a substantially linear ethylene polymer.

Moreover, one of the surprising results obtained with certain embodiments of the solution polymerization systems and processes described herein is the $I_{10}/I_2$ ratio for a given substantially linear ethylene polymer density and melt index (wherein, higher $I_{10}/I_2$ ratios for substantially linear ethylene polymers are uniquely indicative of higher levels of long chain branching) can now be controlled by varying conversion without significantly affecting the polymer concentration in the reaction stream. That is, the present inventive non-adiabatic, continuous polymerization allows the decoupling of reactor temperature and polymer concentration. Whereas for known adiabatic solution polymerization, cooling of the heat of polymerization is provided by the solvent which invariably results in reduced polymer and monomer concentrations, this process limitation is eliminated in the present novel system and process.

By the phrase "certain embodiments" as related to this surprising system or process capability, it is meant that the novel system and process of this invention is operated as a continuous, steady state solution polymerization system and process and utilizes the preferred metallocene catalyst complexes described herein and the resultant product is a substantially linear ethylene polymer.

One implication of this new system or process capability is now a terminator is typically required to produce the same product (respecting melt index, density and LCB) using the novel system and process of the present invention relative to a continuous adiabatic solution polymerization process. The net result of this capability is the novel systems and processes described herein are characterized by a higher long chain branching product/process capability where a terminator is not used to make counter-part products (i.e. substantially linear ethylene polymer products having essentially the same $I_2$ melt index and polymer density). That is, one of the surprising benefits of the present invention is now olefin polymer manufacturers can produce substantially linear ethylene polymers with higher levels or degrees of long chain branching (in the range of 0.01 to 3 long chain branch/1,000 carbons) and higher productivity without substantially affecting catalyst efficiencies. Alternatively, another surprising benefit of this system or process capability is now manufacturers can produce the same substantially linear ethylene polymer products at higher productivities and substantially improved catalyst efficiencies relative to the capabilities existing for known continuous adiabatic solution polymerization processes.

By the phrase "higher long chain branching process/product capability," it is not meant that the present system or process is the only system or process capable of manufacturing substantially linear ethylene polymer products. The phrase is intended to mean the present system or process permits the manufacturing of substantially linear ethylene polymer products at higher production rates without the usual process penalties such as reduced catalysis efficiencies.

The solution polymerization systems and processes disclosed herein are also useful for making olefin elastomers and rubbers, especially ethylene-propylene interpolymers such as, for example, ethylene-propylene-diene monomer (EPDM) elastomers and ethylene-propylene (EP) elastomers, and styrene block copolymers such as, for example, styrene-butadiene block copolymers (SBS), styrene-ethylene-butylene block copolymers (SEBS) and styrene-isoprene block copolymers. ASTM D 1566 defines various physical properties, and the test methods for measuring these properties, of rubbers. U.S. Pat. No. 5,001,205 (Hoel) provides an overview of the known elastomers comprising ethylene copolymerized with an alpha-olefin. As Hoel describes, commercially viable elastomers have various minimum properties, e.g. a Mooney viscosity no less than 10, a weight average molecular weight (Mw) no less than 110,000, a glass transition temperature below −40° C., and a degree of crystallinity no greater than 25%.

The olefin elastomers and rubbers made according to the novel solution polymerization system and process disclosed herein are preferably interpolymers of ethylene or styrene with at least one comonomer selected from the group consisting of aliphatic $C_3$–$C_{20}$ alpha-olefins, conjugated dienes, and nonconjugated dienes. The term interpolymer includes copolymers, e.g. EP, and terpolymers, e.g. EPDM, but is not intended to limit the elastomers made to only one or two monomers copolymerized with ethylene. Examples of the aliphatic $C_3$–$C_{20}$ alpha-olefins include propylene, 1-butene, 4-methyl-1-pentene, 1-hexene, 1-octene, 1-decene, 1-dodecene, 1-tetradecene, 1-hexadecene, 1-octadecene and 1-eicosene. The α-olefin can also contain a cyclic structure such as cyclohexane or cyclopentane, resulting in an alpha-olefin such as 3-cyclohexyl-1-propene (allyl-cyclohexane) and vinyl-cyclohexane. Although not alpha-olefins in the classical sense of the term, certain cyclical olefins such as norbornene and related olefins can be used in place of some or all of the alpha-olefins.

Examples of nonconjugated dienes include aliphatic dienes such as 1,4-pentadiene, 1,4-hexadiene, 1,5-hexadiene, 2-methyl-1,5-hexadiene, 1,6-heptadiene, 6-methyl-1,5-heptadiene, 1,6-octadiene, 1,7-octadiene, 7-methyl-1,6-octadiene, 1,13-tetradecadiene, 1,19-eicosadiene, and the like; cyclic dienes such as 1,4-cyclohexadiene, bicyclo[2.2.1]hept-2,5-diene, 5-ethylidene-2-norbornene, 5-methylene-2-norbornene, 5-vinyl-2-norbornene, bicyclo[2.2.2]oct-2,5-diene, 4-vinylcyclohex-1-ene, bicyclo[2.2.2]oct-2,6-diene, 1,7,7-trimethylbicyclo[2.2.1]hept-2,5-diene, dicyclopentadiene, methyltetrahydroindene, 5-allylbicyclo[2.2.1]hept-2-ene, 1,5-cyclooctadiene, and the like; aromatic dienes such as 1,4-diallylbenzene, 4-allyl-1H-indene; and trienes such as 2,3-diisopropenylidiene- 5-norbornene, 2-ethylidene-3-isopropylidene-5-norbornene, 2-propenyl-2,5-norbornadiene, 1,3,7-octatriene, 1,4,9-decatriene, and the like; with 5-ethylidene-2-norbornene a preferred nonconjugated diene.

Examples of conjugated dienes include butadiene, isoprene, 2,3-dimethylbutadiene-1,3, 1,2-dimethylbutadiene-1,3, 1,4-dimethylbutadiene-1,3, 1-ethylbutadiene-1,3, 2-phenylbutadiene-1,3, hexadiene-1,3, 4-methylpentadiene-1,3, 1,3-pentadiene, 3-methyl-1,3-pentadiene, 2,4-dimethyl-1,3-pentadiene, 3-ethyl-1,3-pentadiene, and the like; with 1,3-pentadiene a preferred conjugated diene.

Copolymers of ethylene and one aliphatic $C_3$–$C_{20}$ alpha-olefin or one diene (either conjugated or nonconjugated) can be prepared using the process of this invention. Interpolymers of ethylene, at least one aliphatic $C_3$–$C_{20}$ alpha-olefin, and/or at least one diene (either conjugated or nonconjugated) can also be made by using this process. Exemplary copolymers include ethylene/propylene and ethylene/1-octene. Exemplary terpolymers include ethylene/propylene/1-octene, ethylene/propylene/5-ethylidene-2-norbornene, ethylene/1-octene/5-ethylidene-2-norbornene, ethylene/propylene/1,3-pentadiene, and ethylene/1-octene/1,3-pentadiene. Exemplary tetrapolymers include ethylene/propylene/1-octene/diene (e.g. ENB) and ethylene/propylene/mixed dienes, e.g. ethylene/propylene/5-ethylidene-2-norbornene/piperylene. In addition, the elastomers made using the process of this invention can include minor amounts, e.g. 0.05–0.5 percent by weight, of long chain branch enhancers, such as 2,5-norbornadiene (also referred to as bicyclo[2,2,1]hepta-2,5-diene), diallylbenzene, 1,7-octadiene ($H_2C=CH(CH_2)_4CH=CH_2$), and 1,9-decadiene ($H_2C=CH(CH_2)_6CH=CH_2$).

At a general minimum, the olefin elastomers and rubbers made by the solution polymerization system and process of this invention comprise at least about 30, preferably at least about 40 and more preferably at least about 50, weight percent ethylene; at least about 15, preferably at least about 20 and more preferably at least about 25, weight percent of at least one alpha-olefin; and 0, preferably at least about 0.1 and more preferably at least about 0.5, weight percent of at least one conjugated or nonconjugated diene.

At a general maximum, the olefin elastomers and rubbers made by the solution polymerization system and process of this invention comprise not more than about 85, preferably not more than about 80 and more preferably not more than about 75, weight percent olefin; not more than about 70, preferably not more than about 60 and more preferably not more than about 55, weight percent of at least one alpha-olefin; and not more than about 20, preferably not more than about 15 and more preferably not more than about 12, weight percent of at least one of a conjugated or nonconjugated diene. All weight percentages are based on weight of the olefin elastomer or rubber which can be determined using any conventional method.

The polydispersity (molecular weight distribution or $M_w/M_n$) of the interpolymer elastomers generally ranges from about 1.5, preferably about 1.8, and especially about 2.0 to about 15, preferably about 10, and especially about 6.

Generally, the $M_w$ of the interpolymer elastomers ranges from about 10,000, preferably about 20,000, more preferably about 40,000, and especially about 60,000 to about 1,000,000, preferably about 800,000, more preferably about 600,000, and especially about 500,000.

The olefin elastomers and rubbers made by the solution polymerization systems and processes according to the present invention cover a range of viscosities, depending upon the molecular weight of the elastomer and optional post polymerization Theological modification. In general, the viscosity of elastomers is characterized by Mooney viscosity which is measured according to ASTM D 1646-89, incorporated herein by reference, using a shear rheometer at 125° C. The Mooney viscosity for the elastomers generally ranges from a minimum of about 1, preferably about 5, more preferably about 10, and especially about 15 to a maximum of about 150, preferably about 125, more preferably about 100, and especially about 80.

The density of the olefin elastomers or rubber is measured according to ASTM D-792. The density of the elastomers or rubber ranges from a minimum of about 0.850 grams/cubic centimeter (g/cm³), preferably about 0.853 g/cm³, and especially about 0.855 g/cm³, to a maximum of about 0.895 g/cm³, preferably about 0.885 g/cm³, and especially about 0.875 g/cm³.

Fabricated articles made from the olefin polymer products made by the solution polymerization system and process of the present invention may be prepared using any conventional olefin fabrication technique. Useful articles include films (e.g., cast, blown and extrusion coated), fibers (e.g., staple fibers, spunbond fibers or melt blown fiber systems as disclosed in U.S. Pat. Nos. 4,340,563; 4,663,220; 4,668,566; or 4,322,027, the disclosures of all of which are incorporated herein by reference, and gel spun fiber systems as disclosed in U.S. Pat. No. 4,413,110, which is incorporated herein by reference), both woven and nonwoven fabrics (e.g., spunlaced fabrics disclosed in U.S. Pat. No. 3,485,706, which is incorporated herein by reference) or structures made from such fibers (including, e.g. blends of these fibers with other fibers, e.g., PET or cotton) and molded articles (e.g. made using an injection molding process, a blow molding process or a rotomolding process). The polymer products described herein are also useful for wire and cable coating operations, shrink film applications as well as in sheet extrusion for vacuum forming operations.

EXAMPLE 1

Using water as a heat transfer media in a solution polymerization system as in FIG. 1 for making polyethylene, heat transfer coefficients varied from about 15 to greater than about 45 Btu/hour·square foot·°F. A twin screw pump was used e.g. as commercially available from Worthington Sierbath. The volumetric heat removal rate for this solution polymerization system was calculated to be about 750 Btu/hour·cubic foot·°F. (14.0 kW/cubic meter·°K).

EXAMPLE 2

In one particular embodiment, the solution polymerization system 10, was operated at a recycle ratio of 7.3 using pumps having a 20 gpm capacity and using two shell-and-tube heat exchangers having 42 tubes each, each tube having a length of 4.25 foot and an outer diameter of about 1.0 inches. The first heat exchanger had a heat transfer coefficient of about 33 Btu/hour·square foot·°F. and the second heat exchanger had a heat transfer coefficient of about 35.4 Btu/hour·square foot·°F. The heat transfer coefficients were calculated by the method that follows. Using the second heat exchanger as an example, the heat removal rate was calculated from the difference between the inlet and outlet temperatures of the water coolant media (about 135.0° C. and about 135.9° C., respectively) times the heat capacity of the water times the flow rate of the water (about 25,000 pounds/ hr (about 500 gallons per minute)). Based on the reacting process side inlet and outlet temperatures (about 147.8° C. and about 151.1° C., respectively) of the counter current heat exchanger, the log mean temperature difference in °C. was about 13.9 (in °F. the log mean temperature difference was about 25). An appropriate equation for determining log mean temperature difference is provided by Perry and Chilton's, *Chemical Engineers, Handbook,* 5th ed., page 10—10, equation 10–27. Dividing the calculated heat transfer rate of about 41,360 Btu/hr by the log mean temperature difference in °F. and by the area of about 46.7 square feet, the calculated heat transfer coefficient was about 35.4 Btu/ hour·square foot·°F.

The volumetric heat removal rate for Example 2 was about 750 Btu/hour·cubic foot·°F. (14.0 kW/cubic meter·°K), the polymer production rate was about 220 pounds per hour and the polymer production rate per unit volume per hour for the linear low density ethylene/1-octene copolymer (LLDPE) was about 4.5 pounds per hour per gallon of system volume. The solvent used was IsoparTm E which is commercially available from Exxon Corporation. The catalyst used was a conventional heterogeneous Ziegler coordination metal catalyst as described, for example, in U.S. Pat. No. 4,314,912. We believe, with the benefit of the above description, one of ordinary skill in the art of olefin polymerization can conveniently scale such an embodiment up to any desired production size facility.

EXAMPLE 3

Using water as a heat transfer media in a solution polymerization system 100, as in FIG. 2, for making ethylene polymer blend product, heat transfer coefficients varied from about 15 to greater than about 45 Btu/hour·square foot·°F. A twin screw pump was used e.g. as commercially available from Worthington Sierbath. The volumetric heat removal rate for this solution polymerization system was calculated to be about 750 Btu/hour·cubic foot·°F. (14.0 kW/cubic meter·°K).

EXAMPLE 4

Using water as a heat transfer media in solution polymerization system 400, as in FIG. 5, for making polyethylene, heat transfer coefficients varied in range of from about 4 to about 15 Btu/hour·square foot·°F. A twin screw pump was used e.g. as commercially available from Worthington Sierbath. The volumetric heat removal rate for this solution polymerization system was calculated to be about 100 Btu/hour·cubic foot·°F. (1.9 kW/cubic meter°°K).

EXAMPLE 5

Using water as a heat transfer media in a solution polymerization system 500, as in FIG. 6, for making polyethylene, heat transfer coefficients varied in range of from about 4 to about 15 Btu/hour·square foot·°F. A twin screw pump was used e.g. as commercially available from Worthington Sierbath. The volumetric heat removal rate for this solution polymerization system was calculated to be about 370 Btu/hour·cubic foot·°F. (6.9 kW/cubic meter·°K).

FIG. 7 compares the volumetric heat removal rates of the novel solution polymerization systems and processes of the present invention (Examples 1, 3, 4 and 5) to known heat transfer processes or reactors. Comparative known processes or reactors (comparative examples 1–5) are identified in FIG. 1 as the corresponding number within a circle. Based on descriptions provided herein and the descriptions provided by Meyer in a paper presented at the AIChe Annual Meeting, Los Angeles, Nov. 17–22, 1991, the appropriate comparisons are as follows: Examples 1 and 3 (Ex. 1 and Ex. 3) should be compared to Comparative Examples 1 and 2; and Examples 4 and 5 (Ex. 4 and Ex. 5) should be compared to Comparative Examples 3 and 4. In FIG. 7, comparative example are the numerals inside a circle. For reactor volumes greater than or equal to about 1 cubic meter, to various comparisons show that the nonadiabatic solution polymerization systems of the present invention are characterized by superior volumetric heat removal rates relative to known processes and/or reactors or, alternatively, at volumetric heat removal rates equivalent to a tortuous, multitube static mixer reactor with heat transfer media flowing through the tubes, the nonadiabatic solution polymerization systems of the present invention provide homogeneous products even where a nontortuous heat exchange apparatus is employed. The latter surprising result is attributed to the combination features which define the present invention, particularly the loop reactor design and a high degree of mixing which insures a well-mixed single phase reaction stream.

The following Table 1 provides the process conditions and product properties of ethylene polymers made using various embodiments of the present invention:

TABLE 1

| | Continuous Non-Adiabatic Loop Reactor System in accordance with FIG. 1 | Continuous Non-Adiabatic Loop Reactor System in accordance with FIG. 1 | Continuous Non-Adiabatic Loop Reactor System in accordance with FIG. 2 Example B | |
|---|---|---|---|---|
| | Example 6 | Example 7 | Flow Loop 101 | Flow Loop 102 |
| Process Temperature, °C. | 156 | NA | 119.0 | 135.8 |
| Process Pressure, psig | 475 | NA | NA | NA |
| Polymer Concentration wt. % | 26 | NA | 18.1 | 25.0 |
| $C_2$ Conversion, % | 93.5 | NA | 89.6 | 91.9 |
| Solvent/$C_2$ feed ratio | 3.4 | NA | 4.0 | NA |
| Solvent flow, lbs./hr | 664 | NA | NA | NA |
| $C_2$ flow, lbs./hr | 195 | NA | 5.2 | NA |
| $C_8$ flow, lbs./hr | 14 | NA | NA | NA |
| Hydrogen flow, sccm | 1151 | NA | 0.03 | None |
| Feed Temp., °C. | 15 | NA | NA | NA |
| Recycle Ratio | 4.8 | NA | NA | NA |
| Primary reactor split, weight % | 100 | 100 | 40 | 60 |
| Residence time, min. | 17.4 | 10.2 | 18.4 | 10.2 |

TABLE 1

| Catalyst Type | Metallocene catalyst complex | Heterogeneous Ziegler-Natta coordination catalyst system | Metallocene catalyst complex | Heterogeneous Ziegler-Natta coordination catalyst system |
|---|---|---|---|---|
| Catalyst efficiency, MM lbs. product/lb. Ti | 0.61 | 0.8 | 2.4 | 0.49 |
| Volumetric heat removal rate, BTU/hr*ft$^3$*°F. | 570 | 682 | 570 | 682 |
| Production rate, lbs./hr.* | 220 | 320 | 125 | 314 |
| $I_2$ Melt Index | 1.5 | 1.1 | Not measured | 0.85 |
| Density, grams/cc | 0.9246 | 0.9189 | Not measured | 0.9267 |
| $I_{10}/I_2$** | 10.1 | 7.63 | Not measured | 7.1 |
| $M_w/M_n$ | 2.2 | 3.8 | Not measured | 3.04 |
| LCB/1000 carbons** | 0.31 | 0.0 | 0.03 | 0.0 |

*Production rate is based on a 6.5 MM BTU/hr cooling capacity as utilized by the different processes or systems.
**While the $I_{10}/I_2$ values shown are actual measured and averaged data for the particular polymer product produced, LCB values were derived from a kinetics model.

The following Table 2 provides the process conditions and product properties of ethylene polymers made using other embodiments of the present invention:

TABLE 2

| | Continuous Non-Adiabatic Loop Reactor System in accordance with FIG. 5 Example 9 | Continuous Non-Adiabatic Loop Reactor System in accordance with FIG. 6 Example 10 |
|---|---|---|
| Process Temperature, °C. | 139 | 134 |
| Process Pressure, psig | 475 | 475 |
| Polymer Concentration wt. % | 22.0 | 22.1 |
| $C_2$ Conversion, | 90.9 | 87.6 |

TABLE 2-continued

| | Continuous Non-Adiabatic Loop Reactor System in accordance with FIG. 5 Example 9 | Continuous Non-Adiabatic Loop Reactor System in accordance with FIG. 6 Example 10 |
|---|---|---|
| % Solvent/$C_2$ feed ratio | 4.0 | 4.0 |
| $C_2$ flow, lbs./hr. | 8,600 | 8,400 |
| $C_8$ flow, lbs./hr | 1,350 | 1,650 |
| Hydrogen, mole % | 0.01 | 0.01 |
| Recycle Pump flow, gallons/min. | 5,000 | 3,300 |
| Recycle Ratio | 38.2 | 25.9 |
| Residence time, min. | 38.5 | 18.4 |
| Catalyst Type | Metallocene catalyst complex | Metallocene catalyst complex |
| Catalyst efficient, MM lbs. product/lb. Ti | 1.2 | 1.5 |
| Volumetric heat removal rate, BTU/hr*ft$^3$*° F. | 100 | 370 |
| Production rate, lbs./hr.* | 9,430 | 9,250 |
| $I_2$ Melt Index | 1.0 | 1.0 |
| Density, qrams/cc | 0.909 | 0.902 |
| $I_{10}/I_2$** | 10.0 | 9.0 |
| $M_w/M_n$ | 2.2 | 3.8 |
| LCB/1000 carbons** | 0.130 | 0.061 |

*Production rate is based on a 6.5 MM BTU/hr cooling capacity as utilized by the different processes or systems.
**While the $I_{10}/I_2$ values shown are actual measured and averaged data for the particular polymer product produced, LCB values were derived from a kinetics model.

In another evaluation, a substantially linear ethylene/1-octene polymer was made using an adiabatic solution polymerization process comprising a continuously stirred tank reactor (Comparative Example 13) and was compared to two instances (Examples 11 and 12) of the same product (i.e. having the same comonomer and essentially the same melt index and density) made using a non-adiabatic solution polymerization system and process according to the present invention, as described in FIG. 5, and operated continuously. In the evaluation, water was used as the heat transfer media for Examples 11 and 12 and the same metallocene catalyst systems was used for all three examples. The heat of polymerization was removed by the solvent in the feed for Comparative Example 13. That is, the solvent functions as a heat sink and as such Comparative Example 13 was representative of a continuous adiabatic solution polymerization system. The process conditions and resulting product properties for the three example polymerizations are shown in Table 3.

TABLE 3

| | Continuously Stirred Tank Adiabatic Reactor Comp. Example 13 | Continuous Non-Adiabatic Loop Reactor System Example 11 | Continuous Non-Adiabatic Loop Reactor System Example 12 |
|---|---|---|---|
| Process Temperature, ° C. | 111.4 | 119.0 | 135.8 |
| Process Pressure, psig | 475 | 475 | 475 |
| Polymer Concentration, wt. % | 9.1 | 18.1 | 25.0 |
| $C_2$ Conversion, % | 86.0 | 89.6 | 91.9 |
| $C_2$ Concentration, m/l | 0.28 | 0.40 | 0.20 |
| Solvent/$C_2$ feed ratio | 11.3 | 5.2 | 3.6 |
| Hydrogen, mole % | None | 0.03 | None |
| Catalyst Type | Metallocene Catalyst System | Metallocene Catalyst System | Metallocene Catalyst System |
| Catalyst Efficiency, MM lb. product/lb. Ti | 1.2 | 1.65 | 1.1 |
| Production Rate*, lbs./hr. | 3,400 | 7,000 | 10,000 |
| Volumetric heat removal rate, BTU/hr*ft$^3$*° F. | 0.0 | about 100 | about 100 |
| $I_2$ Melt Index, g/10 minutes | 0.83 | 0.80 | 0.90 |
| Density, gm/cc | 0.905 | 0.905 | 0.905 |
| $I_{10}/I_2$** | 9.0 (maximum)*** | 9.3 | 11.5 |
| Mw/Mn | 2.1 | 2.1 | 2.3 |
| Vinyls/1000 Carbons | 0.026 | 0.024 | 0.058 |
| Long chain branching per 1000 Carbon** | 0.084 | 0.085 | 0.21 |

*Production rate is based on a 6.5 MM BTU/hr cooling capacity as utilized by the different processes or systems.
**While the $I_{10}/I_2$ values shown are actual measured and averaged data for the particular polymer product produced, LCB values were derived from a kinetics model.
***The $I_{10}/I_2$ value shown is the maximum value for this particular system for this particular density, melt index and catalyst system.

Surprisingly, the results shown in Table 3 indicate that certain embodiments of the present invention allow olefin polymer manufacturers to prepare substantially linear ethylene polymers in a novel system or process characterized by significantly improved process/product capabilities such as, for example, significantly higher catalysis efficiencies when producing essentially the same product than was previously possible without the benefit of the present invention.

In regards to this system or process capability, by the phrase "essentially the same", it is meant that measured, averaged melt index and density values are within 10 percent of each other for the substantially linear ethylene polymer products being compared.

In addition to the surprising results in Table 3, FIG. 8 (which is a contour plot) illustrates the $I_{10}/I_2$ process capability range as a function of production rate and product density for the novel solution polymerization system and process used for Examples 11 and 12 and the polymerization process used for Comparative Example 13. For the novel system and process, the high-end $I_{10}/I_2$ capability range is designated line A and the low-end $I_{10}/I_2$ capability range is designated line C in FIG. 8. Lines B and D denote the $I_{10}/I_2$ capability range determined for the adiabatic solution polymerization used for Comparative Example 1. While FIG. 8 indicates either process can provide the same $I_{10}/I_2$ values, the figure also indicates the present invention permits significantly improved production rates when producing the same product.

In another embodiment, a substantially linear ethylene/1-octene polymer was prepared using an alternate metallocene catalyst ((tert-butylamido)(tetramethyl-$\eta^5$-cyclopentadienyl)dimethyl-silanetitanium (II) 1,3-pentadiene). The polymerization conditions and resultant polymer properties are set forth in the following Table 4.

TABLE 4

|  | Example 14 Continuous Non-Adiabatic Loop Reactor System |
|---|---|
| Process Temperature, ° C. | 146 |
| Process Pressure, psig | 535 |
| Polymer Concentration, wt. % | 14.2 |
| $C_2$ Conversion, % | 88 |
| Solvent/$C_2$ feed ratio | 6.0 |
| $C_2$ flow (lbs/hr) | 209 |
| $C_8$ flow (lbs/hr) | 35.4 |
| Hydrogen, mole % | 0.19 |
| Recycle pump flow (gallons/min) | 6.7 |
| Recycle ratio | 4.8 |
| Residence time (min) | 7.2 |
| Catalyst Efficiency, MM lb./lb. Ti | 0.56 |
| Production Rate*, lbs./hr. | 200 |
| Volumetric heat removal rate, BTU/hr*ft$^3$*° F. | 360 |
| $I_2$ Melt Index, g/10 minutes | 0.5 |
| Density, gm/cc | 0.919 |
| $I_{10}/I_2$ | 12.0 |
| Mw/Mn | 2.2 |
| Long chain branching per 1000 Carbons** | 0.115 |

What is claimed is:

1. A nonadiabatic solution polymerization process for making a polymer comprising ethylene and at least one other monomer in at least one reactor stream of at least one reactor with catalyst and solvent, the process comprising:
   (A) at least one flow loop which forms the at least one reactor, the at least one reactor having a reactor volume and the at least one flow loop having:
      (1) at least one product outlet,
      (2) at least one catalyst inlet through which catalyst flows into the at least one flow loop,
      (3) at least one monomer inlet through which monomer flows into the at least one flow loop and, with catalyst and solvent, forms a reaction stream,
      (4) at least one heat exchange apparatus which receives the reaction stream and polymer formed therein, and which removes heat of reaction or polymerization from nthe at least one flow loop, and
      (5) at least one pump apparalls for pumping the reaction stream and polymer around the at least one flow loop,
   (B) a portion of the reaction stream and polymer exiting the at least one flow loop through the at least one product outlet, and
   (C) the at least one heat exchange apparatus removing heat of reaction or polymerization from the polymer and reaction stream at a rate of at least 400 Btu/hour·cubic foot·°F. (7.4 kW/m$^3$·°K),
   wherein the polymer is characterized as being homogeneously branched as indicated by a comonomer distribution branching index (CDBI) greater than 50 percent, as determined using a temperature rising elution fractionation technique, and
   wherein the at least one flow loop has a flow loop volume of greater than or equal to 1 cubic meter and polymer is produced at a rate of at least 5 pounds per hour per gallon of flow loop volume.

2. The process of claim 1 wherein the heat exchange apparatus removes heat at a rate of at least 600 Btu/hour·cubic foot·°F.

3. The process of claim 1 wherein the heat exchange apparatus removes heat at a rate of at least 1200 Btu/hour·cubic foot·°F.

4. The process of claim 1 wherein the heat exchange apparatus comprises
   a first heat exchanger, the first heat exchanger comprising a housing through which a heat transfer media flows and a plurality of static mixer heat exchange tubes through which the reaction stream and polymer flow, the reaction stream and polymer flowing out from the first heat exchanger into the at least one flow loop for further movement therethrough.

5. The process of claim 4 further comprising
   at least one additional heat exchanger on the at least one flow loop for receiving the reaction stream and polymer and for removing heat of reaction or polymerization from the reactor stream, and
   the pump apparatus pumping the reaction stream and polymer to the product outlet, a portion of the polymer and reaction stream flowing out from the product outlet and a portion of the reaction stream and polymer recycling through the at least one flow loop.

6. The process of claim 1 wherein the reaction stream flow is substantially laminar.

7. The process of claim 6 wherein the Reynold's number of the reaction stream flow is at most 2,200.

8. The process of claim 1 further comprising
   the at least one monomer inlet positioned downstream of the at least one catalyst inlet.

9. The process of claim 8 wherein the heat exchange apparatus comprises a first heat exchanger and at least one additional heat exchanger, the system further comprising
   the one catalyst inlet and one monomer inlet above the first heat exchanger, and
   the pump apparatus for pumping the reaction stream and polymer from the first heat exchanger to the at least one additional heat exchanger.

10. The process of claim 1 further comprising
    at least one static mixer disposed in the at least one flow loop between the at least one catalyst inlet and the at least one monomer inlet for reactor stream.

11. The process of claim 1 further comprising
    at least one static mixer disposed in the at least one flow loop between the at least one monomer inlet and the at least one heat exchange apparatus for mixing the reaction stream.

12. The process of claim 1 further comprising
    a monomer injector in the at least one flow loop in fluid communication with the at least one monomer inlet, so that monomer and solvent flow into the at least one flow loop through the monomer injector.

13. The process of claim 12 wherein the monomer injector comprises
    a hollow body with a hollow inlet and a plurality of spaced-apart hollow arms in fluid communication with the hollow inlet,
    each of the plurality of hollow arms having a plurality of spaced apart fluid exit ports through which monomer flows into the at least one flow loop.

14. The process of claim 13 further comprising
    the at least one monomer inlet disposed downstream of the at least one catalyst inlet.

15. The process of claim 1 wherein solvent flows with catalyst into the at least one flow loop through the at least one catalyst inlet.

16. The process of claim 1 wherein solvent flows with monomer into the at least one flow loop through the at least one monomer inlet.

17. The process of claim 1 further comprising a catalyst injector in the flow loop in fluid communication with the at least one catalyst inlet so that catalyst and solvent flow into the at least one flow loop through the catalyst injector.

18. The process of claim 17 further comprising the catalyst injector comprising
a body with a solvent inlet,
a mixing zone into which solvent flows in fluid communication with the solvent inlet,
a catalyst port through which catalyst is introducible into the mixing zone, and
an outlet through which flows mixed catalyst and solvent into the at least one flow loop.

19. The process of claim 1 wherein the reaction stream and polymer are maintained substantially as a single liquid phase solution.

20. The process of claim 1 wherein the at least one flow loop has a flow loop volume of greater than or equal to 1 cubic meter and polymer is produced at a rate of at least 12 pounds per hour per gallon of flow loop volume.

21. The process of claim 1 wherein the at least one flow loop has a flow loop volume of greater than or equal to 1 cubic meter and polymer is produced at a rate of at least 15 pounds per hour per gallon of flow loop volume.

22. The process of claim 1 wherein polymer is produced with a recycle ratio of less than 50.

23. The process of claim 1 wherein polymer is produced with a recycle ratio of less than 25.

24. The process of claim 1 wherein polymer is produced with a recycle ratio of less than 15.

25. The process of claim 24 wherein the catalyst is selected from the group consisting of heterogeneous catalyst and homogeneous catalyst.

26. The process of claim 1 wherein polymer is produced with a recycle ratio of less than 10.

27. The process of claim 1 wherein the polymer is polyethylene.

28. The process of claim 1 wherein
a terminating agent is introduced through the at least one monomer inlet.

29. The process of claim 28 wherein
the terminating agent is hydrogen.

30. The process of claim 1 wherein residence time is at most 12 minutes.

31. A nonadiabatic solution polymerization process for making a polymer comprising ethylene and at least one other monomer in a reactor stream of two or more reactors with catalyst and solvent, the process comprising:

(A) a first flow loop which forms a first reactor, the first reactor having a first reactor volume and the first flow loop having:
(i) at least one first product outlet,
(ii) at least one first catalyst inlet through which catalyst flows into the first flow loop,
(iii) at least one first monomer inlet through which monomer flows into the first flow loop and, with catalyst and solvent, forms a first reaction stream,
(iv) at least one first heat exchange apparatus which receives the first reaction stream and first polymer formed therein, and which removes heat of reaction or polymerization from the first flow loop, ad
(v) at least one first punp apparatus for pumping the first reaction stream and first polymer in the first flow loop from the at least one first heat exchange apparatus to the at least one first product outlet, and (B) a second flow loop which forms a second reactor, the second reactor having a second reactor volume and the second flow loop having:
(i) at least one second product outlet,
(ii) at least one second catalyst inlet through which catalyst flows into the second flow loop,
(iii) at least one second monomer inlet through which monomer flows into the second flow loop and, with catalyst and solvent, forms a second reaction stream,
(iv) at least one second heat exchange apparatus which receives the second reaction stream and second polymer formed therein, and which removes heat of reaction or polymerization from the second flow loop, and
(v) at least one second pump apparatus for pumping the second reaction stream and second polymer in the second flow loop from the at least one second heat exchange apparatus to the second product outlet, and (C) the at least one first heat exchange apparatus and the at least one second heat exchange apparatus removing total heat of reaction or polymerization from the reactor streams at a rate of at least 400 Btu/hour·cubic foot·°F. (7.4 kW/m$^3$·°K), (D) the second flow loop having at least one product inlet into which flows the first polymer and a portion of the first reactor stream from the at least one first product outlet of the first flow loop, and (E) a portion of first polymer, second polymer, first reaction stream and second reaction stream exiting the second flow loop through the at least one second product outlet wherein the polymer is characterized being homogeneously branched as indicated by a comonomer distribution branching index (CDBI) greater than 50 percent, as determined using a temperature rising elution fractionation technique, and wherein the at least one flow loop has a flow loop volume of greater than or equal to 1 cubic meter and polymer is produced at a rate of at least 5 pounds per hour per gallon of flow loop volume.

32. The process of claim 31 wherein each reaction stream with polymer is maintained substantially as a liquid phase solution.

33. The process of claim 31 wherein polymer is produced at a rate of at least 12 pounds per hour per gallon of reactor volume.

34. The process of claim 31 wherein polymer is produced at a rate of at least 15 pounds per hour per gallon of reactor volume.

35. The process of claim 31 wherein polymer is produced with a recycle ratio of less than 50.

36. The process of claim 31 wherein polymer is produced with a recycle ratio of less than 25.

37. The process of claim 31 wherein polymer is produced with a recycle ratio of less than 15.

38. The process of claim 31 wherein polymer is produced with a recycle ratio of less than 10.

39. The process of claim 31 wherein the polymer is polyethylene.

40. The process of claim 31 for continuously polymerizing the monomer.

41. A nonadiabatic solution polymerization process for making a polymer comprising ethylene and at least one other monomer, the process comprising feeding monomer into at least one flow loop, the at least one flow loop forming at least one reactor, feeding catalyst into the at least one flow loop, feeding solvent into the at least one flow loop, the monomer, catalyst, and solvent forming a reaction stream in which a polymerization reaction of the monomer to the polymer occurs giving off heat of reaction or polymerization, flowing the reaction stream to at least one heat exchange apparatus, wherein heat of reaction or polymerization is removed from the polymer and reaction stream at a rate of at least 400 Btu/hour·cubic foot·°F. (7.4 kW/m$^3$·°K), and a portion of the polymer and reaction stream exiting the at least one flow loop through a product outlet and the remainder thereof recycling back through the at least one flow loop wherein the polymer is characterized being homogeneously branched as indicated by a comonorner distribution branching index (CDBI) greater than 50 percent, as determined using a temperature rising elution fractioration technique, and wherein the at least one flow loop has a flow loop volume of greater than or equal to 1 cubic meter and polymer is produced at a rate of at least 5 pounds per hour per gallon of flow loop volume.

42. The process of claim 41 wherein the at least one heat exchange apparatus removes heat at a rate of at least 600 Btu/hour·cubic foot·°F.

43. The process of claim 41 wherein the at least one heat exchange apparatus removes heat at a rate of at least 1200 Btu/hour·cubic foot·°F.

44. The process of claim 41 wherein the at least one heat exchange apparatus comprises a first heat exchanger, the first heat exchanger comprising a housing through which a heat transfer media flows and a plurality of static mixer heat exchange tubes through which the reaction stream and polymer flow, the process further comprising flowing the reaction stream and polymer through and from the first-heat exchanger into the at least one flow loop for further move,ment therethrough.

45. The process of claim 44 wherein at least one additional heat exchanger is on the at least one flow loop for receiving the reaction stream and polymer and for removing heat of reaction or polymerization from the reactor stream, and the process further comprising pumping the reaction stream and polymer to the product outlet with at least one pump apparatus, a portion of the polymer and reaction stream flowing out from the product outlet and a portion of the reaction stream and polymer recycling through the at least one flow loop.

46. The process of claim 41 wherein there is at least one monomer inlet positioned downstream of a catalyst inlet and the process further comprising feeding monomer through the at least one monomer inlet into the flow loop.

47. The process of claim 41 wherein a static mixer is disposed in the flow loop between a catalyst inlet and a monomer inlet and the process further comprising mixing the reaction stream with the static mixer.

48. The process of claim 44 wherein a static mixer is disposed in the at least one flow loop between a monomer inlet and the at least one heat exchange apparatus for mixing the reaction stream, and the process further comprising mixing the reaction stream with the static mixer.

49. The process of claim 41 wherein a monomer injector is in the flow loop in fluid communication with a monomer inlet, and the process further comprising flowing monomer and solvent flow into the flow loop through the monomer injector.

50. The process of claim 41 further comprising flowing catalyst with solvent into the flow loop through a catalyst inlet.

51. The process of claim 41 further comprising flowing monomer with solvent into the at least one flow loop through a monomer inlet.

52. The process of claim 41 wherein a catalyst injector is in the flow loop in fluid communication with an at least one catalyst inlet, and the process further comprising flowing catalyst and solvent into the flow loop through the catalyst injector.

53. The process of claim 52 further comprising the catalyst injector comprising a body with a solvent inlet, a mixing zone into which solvent flows in fluid communication with the solvent inlet, a catalyst port through which catalyst is introducible into the mixing zone, and an outlet through which flows mixed catalyst and solvent into the flow loop.

54. The process of claim 41 wherein the reaction stream with polymer is maintained substantially as a liquid phase solution.

55. The process of claim 41 wherein polymer is produced with a recycle ratio of less than 50.

56. The process of claim 41 wherein the polymer is polyethylene.

57. The process of claim 41 further comprising continuously feeding monomer, catalyst and solvent to the flow loop and continuously removing a portion of polymer product and reaction stream through the product outlet.

58. A nonadiabatic solution polvmerization process for making a polymer comprising ethylene and at least one other monomer, the process comprising feeding monomer into a first flow loop, the first flow loop comprising a first recycling reactor having a first reactor volume, feeding catalyst into the first flow loop, feeding solvent into the first flow loop, the monomer, catalyst, and solvent forming a first reaction stream in which a polymerization reaction of the monomer to a first polymer occurs giving off heat of reaction or polymerization, flowing the first reaction stream to first heat exchange apparatus, wherein heat of reaction or polymerization is removed from the first polymer and first reaction stream at a rate of at least 400 Btu/hour·cubic foot·°F., at least a portion of the first polymer and first reaction stream exiting the first flow loop through a first product outlet, feeding monomer into a second flow loop, the second flow loop comprising a second recycling reactor having a second reactor volume, feeding catalyst into the second flow loop, feeding solvent into the second flow loop, the monomer, catalyst, and solvent forming a second reaction stream in which a polymerization reaction of the monomer to a second polymer like the first polymer occurs giving off heat of reaction or polymerization, flowing the reaction stream to second heat exchange apparatus, wherein heat of reaction or polymerization is removed from the second polymer and second reaction stream at a rate of at least 400 Btu/hour·cubic foot·°F., and at least a portion of the second polymer and second reaction stream exiting the second flow loop through a second product outlet wherein the polymer is characterized being homogeneously branched as indicated by a comonomer distribution branching (CDBI) index greater than 50 percent, as determined using a temperature rising elution fractionation technique, and wherein the at least one flow loop has a flow loop volume of greater than or equal to 1 cubic meter and polymer is produced at a rate of at least 5 pounds per hour per gallon of flow loop volume.

59. The process of claim 58 further comprising feeding the portion of the first polymer and of the first reaction stream portion flowing from the first product outlet to the second flow loop.

60. The process of claim 58 wherein there is a common outlet line and the process further comprises feeding the portion of first polymer and first reactor stream flowing from the first product outlet to the common outlet line, and feeding the portion of second polymer and second reactor stream portion flowing from the second product outlet to the common outlet line.

61. The process of claim 1 for continuously polymerizing the monomer.

62. The process of claim 58 further comprising continuously feeding monomer, catalyst and solvent to the first and second flow loops and continuously removing a portion of polymer product and reaction stream through the second product outlet.

* * * * *